United States Patent [19]
Wilkes

[11] Patent Number: 4,713,976
[45] Date of Patent: Dec. 22, 1987

[54] DIFFERENTIAL HAVING A GENERALLY SPHERICAL DIFFERENCING ELEMENT

[75] Inventor: Donald F. Wilkes, Albuquerque, N. Mex.

[73] Assignee: Vern Heinrichs, In Trust, Toronto, Canada

[21] Appl. No.: 734,347

[22] Filed: May 16, 1985

Related U.S. Application Data

[63] Continuation-in-part of Ser. No. 714,950, Mar. 22, 1985, abandoned.

[51] Int. Cl.⁴ ............................................. F16H 15/00
[52] U.S. Cl. .......................................... 74/190; 74/200
[58] Field of Search ................. 74/190, 190.5, 198, 74/200, 201, 206, 209, 213, 798, 750 R, 796

[56] References Cited

U.S. PATENT DOCUMENTS

| | | | |
|---|---|---|---|
| 1,868,234 | 7/1932 | Hunt | 74/190.5 |
| 2,126,772 | 8/1938 | Haskell | 74/190.5 |
| 2,157,065 | 5/1939 | Madle | 74/190.5 |
| 3,222,944 | 12/1965 | Harned | 74/190.5 |
| 3,237,468 | 3/1966 | Schottler | 74/190.5 |
| 3,420,122 | 1/1969 | Okabe | 74/190 |
| 3,793,907 | 2/1974 | Nakamura et al. | 74/198 X |
| 4,428,246 | 1/1984 | Horton et al. | 74/190 |
| 4,434,676 | 3/1984 | Horton | 74/200 |
| 4,448,087 | 5/1984 | Barzel | 74/198 X |

FOREIGN PATENT DOCUMENTS

| | | | |
|---|---|---|---|
| 1027075 | 5/1953 | France | 74/190.5 |
| 0046260 | 4/1977 | Japan | 74/213 |
| 1376057 | 12/1974 | United Kingdom | 74/198 |

*Primary Examiner*—Leslie Braun
*Assistant Examiner*—David Novais
*Attorney, Agent, or Firm*—Burns, Doane, Swecker & Mathis

[57] ABSTRACT

A differential mechanism can be driven by either or both of two inputs to provide an output rotational speed that is variable and can exceed, be equal to, can be less than, and can even be opposite to the input rotational speed. The differential uses a self-centering spherical element made of a structural thermoplastic material and which engages a pair of friction rings, one connected with an input assembly and one connected with an output assembly. A loading arrangement resiliently biases the spherical element into frictional engagement with the friction rings in a manner which is independent of the orientation of the spherical element with respect to the friction rings. Control of the rotational position of the spherical element is effected by an axially actuatable rod or a centrally disposed linkage so that the output rotational speed can be controlled. Powered control of the position of the spherical element can be provided.

18 Claims, 15 Drawing Figures

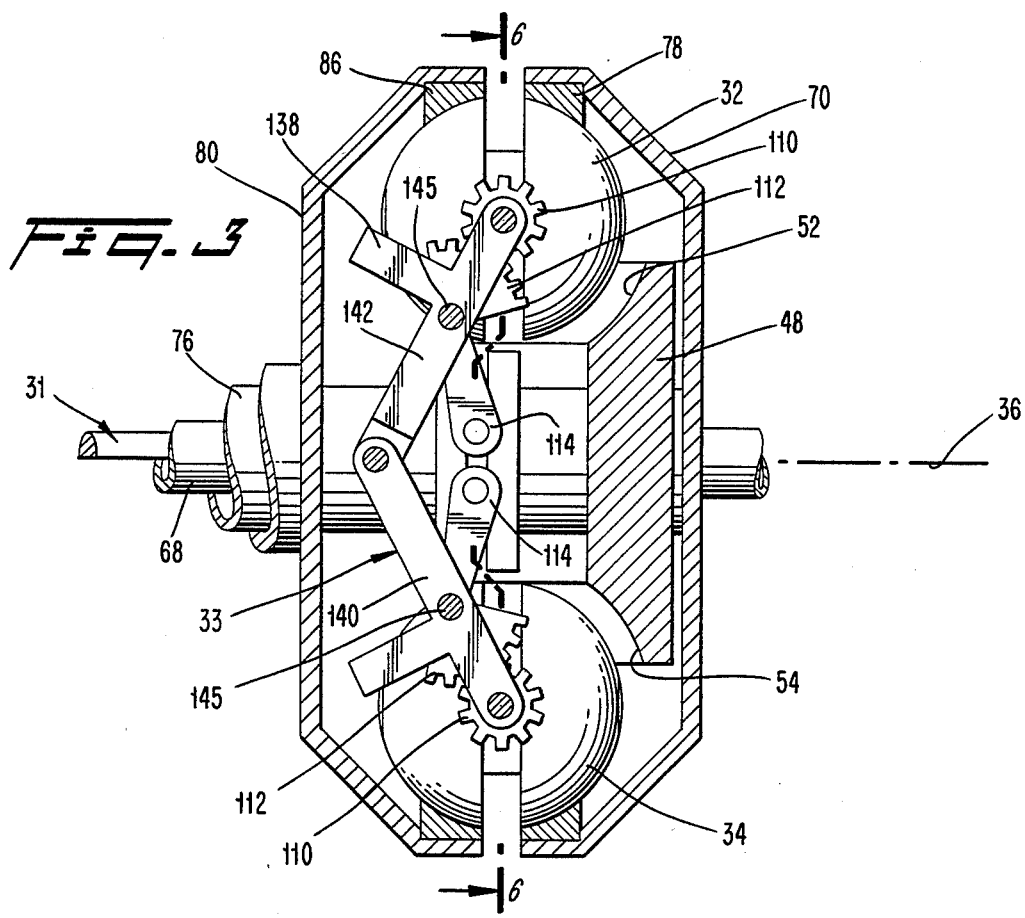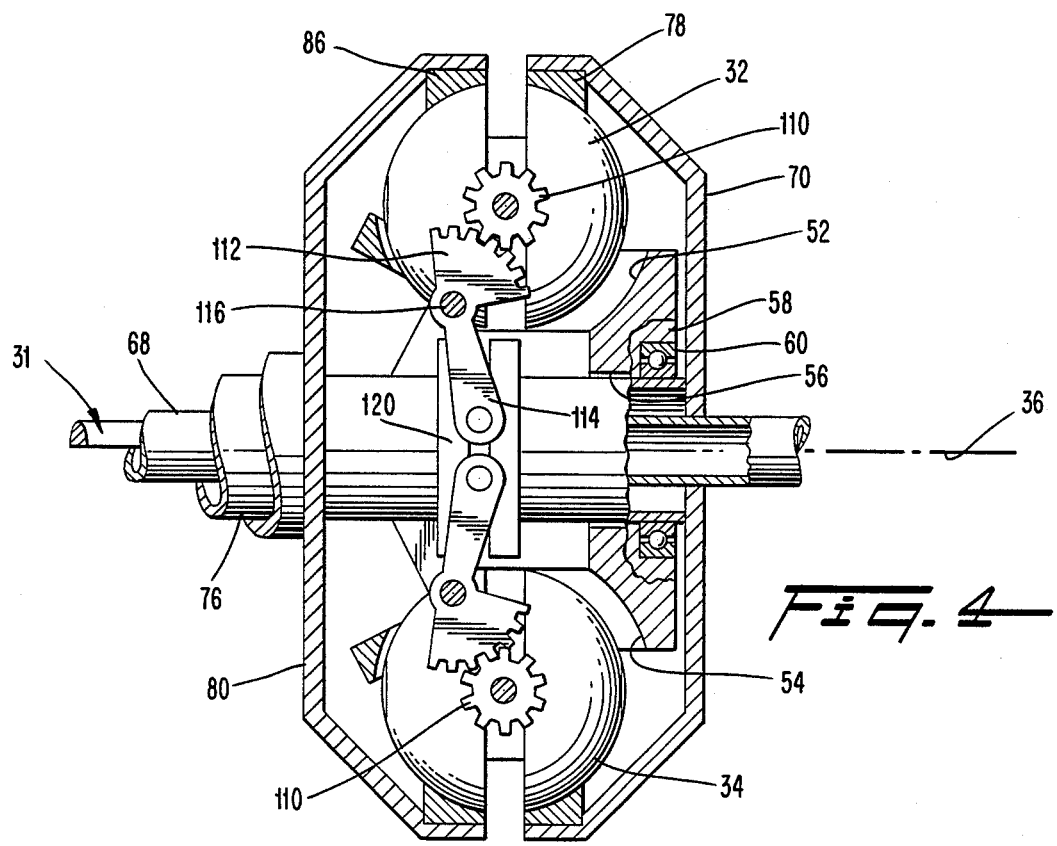

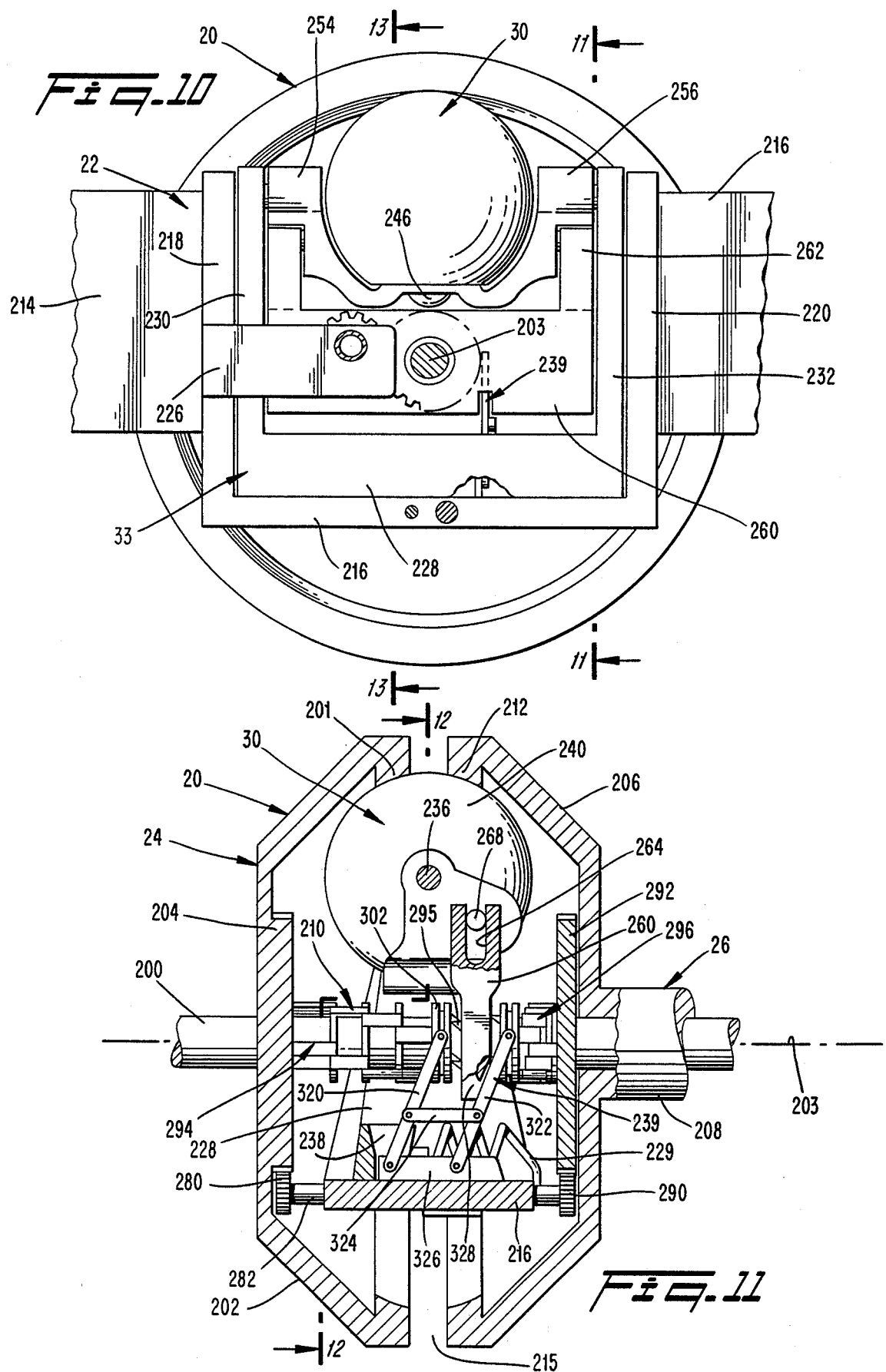

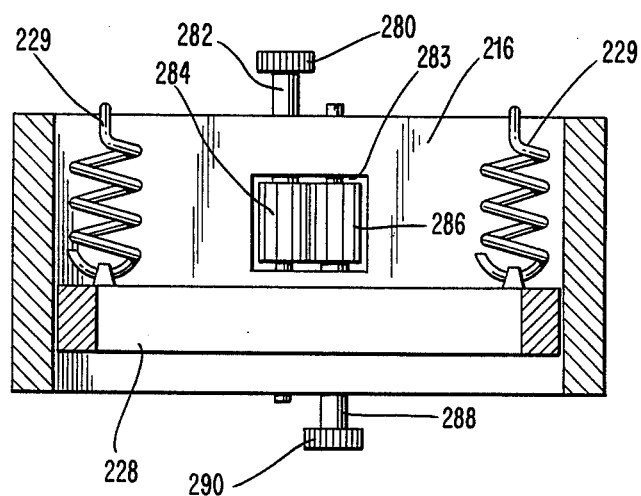
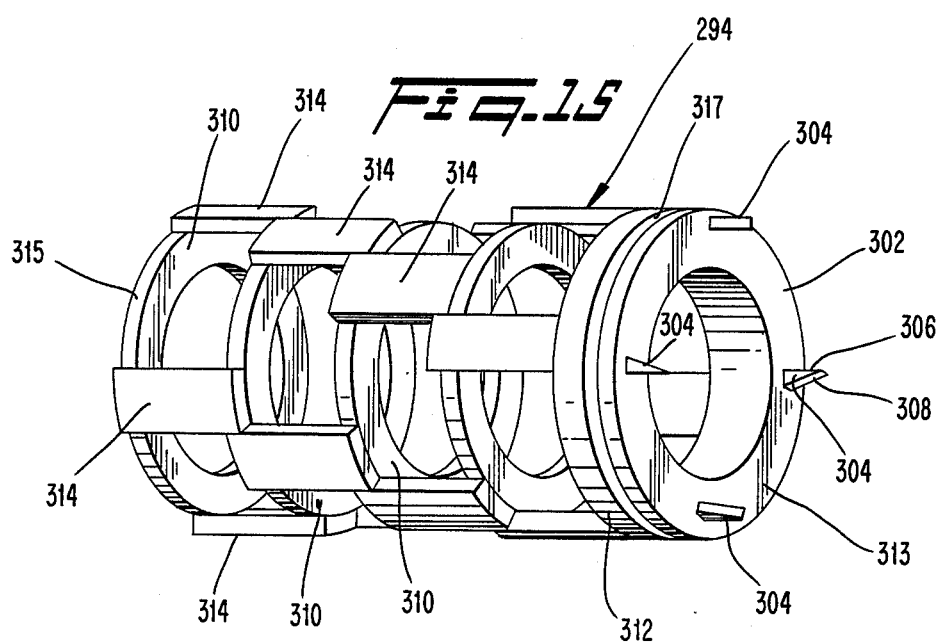

DIFFERENTIAL HAVING A GENERALLY SPHERICAL DIFFERENCING ELEMENT

CROSS REFERENCE TO RELATED APPLICATION

This application is a continuation in part of U.S. patent application Ser. No. 714,950, filed Mar. 22, 1985 by Donald F. Wilkes, now abandoned.

BACKGROUND

The present invention relates generally to differential mechanisms which provide two output speeds for a single input speed, the output speeds being variable relative to one another. More particularly, the present invention concerns a differential mechanism which can accept a linear input to regulate the two relative output speeds.

Typical differential mechanisms that have been available in the past suffer from some problems and disadvantages which are undesireable, particularly where a solution exists which will obviate those problems and disadvantages. For example, one problem associated with the known differential devices concerns their behaviour when used to drive two wheels of a vehicle over a slippery surface. If one of the two wheels should slip, then that wheel spins and the other wheel does not receive any power. As a result, the vehicle being driven by those two wheels does not move forward, at least not in a controlled fashion.

In situations where such spinning of one wheel has commenced, there are subsequent problems. Often, the spinning wheel digs itself into underlying ground, mud, or sand dispersing the material of that underlying surface and creating a depression which contains the wheel. That depression further aggravates the difficulty in getting the vehicle moving again in a controlled, forward direction. In addition, the friction generated between the spinning wheel and the underlying surface generates significant amounts of heat which can, and does, burn the rubber material of the associated tire leading to significantly reduced tire life.

Another shortcoming of the known systems relates to the manner in which a vehicle associated with the differential is steered. Virtually all of the known systems use an auxiliary device to steer the vehicle. The differential is used merely to permit the drive wheels to turn corners without sliding when ground traction is reasonably consistent. In such arrangements, the auxiliary device offers no assistance to overcome the problems noted above. Moreover, there exists the additional complexity and expense of the steering device.

SUMMARY OF THE INVENTION

A differential mechanism according to the present invention includes a support means for connecting the mechanism to the vehicle in which the mechanism is being used. Rotatable input means is rotatably supported by the support means. The rotatable input means may include a shaft means and a torque tube means, either of which can be used to deliver rotary input to the differential mechanism. To take rotary output power from the differential mechanism, an output means is provided. The output means can be conveniently supported on the input means for relative rotation, for example, supported on the torque tube.

A differencing means is provided between the input means and the output means to regulate or control the relative rotational speeds of the input means and the output means. Preferably the differencing means includes at least one generally spherical element rotatably mounted on a gimbal for rotation about an axis generally perpendicular to the axis of the gimbal.

To provide sufficient tractive force between the differencing means and the input means and between the differencing means and the output means, a loading means is provided. The loading means is supported by the support means and arranged such that it exerts a purely radially directed force on the generally spherical element. Moreover, the loading means acts independently of the differencing means so that the loading means is insensitive to the orientation of the generally spherical element. Even though the operation of the loading means is independent, the radial centerline through the center of the input means and the spherical element always stays in alignment with the radial loading provided by the loading means.

A centrally disposed control means may be provided to regulate the differencing means. The control means may be operable in response to a substantially linear input to vary the position of the axis of the generally spherical element about the axis of a corresponding gimbal. In this fashion, the relative speeds of the input and output means can be regulated to any desired value. Moreover, since the generally spherical element can be rotated by the control means through an angle of as much as 90 degrees from the neutral position, the rotational direction of the input and output means can actually be opposite to one another.

In an alternate embodiment, the control means may include a linkage which is accessable from the outside of the differential mechanism. By articulating the linkage, the angular orientation of the spherical element around the axis of the associated gimbal can be adjusted so as to control the relative rotational rates of the input means and the output means.

To reduce the effort otherwise needed to operate the differential device, a powered means may be provided. The powered means includes a pair or counterrotating axially extensible torque transmitting devices which are clutched into engagement with a pinion. That pinion cooperates with a second pinion carried by a threaded shaft so that rotation of the pinions also causes the assembly to translate along the shaft.

BRIEF DESCRIPTION OF THE DRAWINGS

Many objects and advantages of the present invention will be apparent to those skilled in the art when this specification is read in conjunction with the attached drawings wherein like reference numerals have been applied to like elements:

FIG. 3 is a view in partial cross section taken along the line 3—3 of FIG. 2 showing elements of the loading means;

FIG. 4 is a view in partial cross section taken along the line 4—4 of FIG. 2 showing elements of the differencing means;

FIG. 10 is a view in partial cross section of another embodiment of the differential mechanism;

FIG. 11 is a side elevational view in partial cross section taken along the line 11—11 of FIG. 10 with some portions broken away to illustrate further details of the invention;

FIG. 14 is a partial cross sectional view taken generally along the line 14—14 of FIG. 13; and FIG. 15 is an enlarged detail view of a torque expander used in the power steering means.

DESCRIPTION OF THE PREFERRED EMBODIMENT

Figure 1:
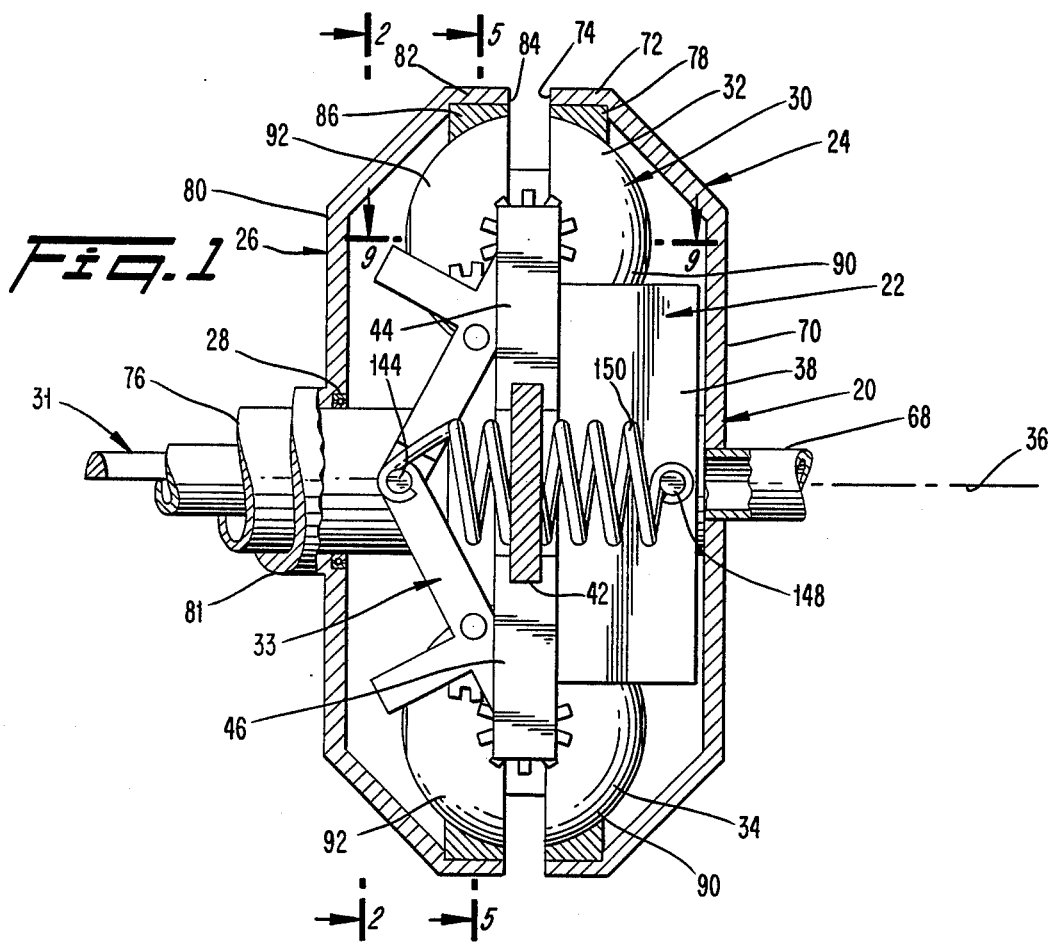
FIG. 1 is an elevational view in partial cross section of a differential mechanism in accordance with the present invention.

Turning now to FIG. 1, a differential mechanism is illustrated. The differential mechanism may also include a cover assembly (not shown) which encloses the mechanism in order to prevent foreign matter from entering the mechanism and to contain lubricants and particles generated from wearing of internal parts.

Such a cover assembly can, for example, be fashioned from metal or plastic with a shape that generally conforms to the external contours shown for the differential mechanism. The cover would preferably have two substantially identical parts which differ primarily in the lateral openings provided to receive the various shafts providing inputs and outputs to the mechanism. To connect the parts of the cover assembly, suitable conventional threaded fasteners can be used along the parting line between the two parts. By also mounting the two parts to a support means 22, the cover assembly is spatially fixed.

The support means 22 provides rotational and spatial support for an input means 24 that provides rotary input to the differential mechanism. With the input means 24 comtemplated, either of two different sources of input power can be used to supply rotary power and rotational speed to drive the differential mechanism 20. When the differential mechanism 20 is used in connection with a wheelchair, the ability to use two different sources of input power is particularly useful. More particularly, one source of power can be the manual effort of the wheelchair occupant, while a second source of power can be a motor drive system. Thus, the required effort to drive the differential mechanism 20 and thereby move the wheelchair can be provided by either of the sources of power, or even by both sources of power simultaneously.

An output means 26 is rotatably mounted on the input means 24 for relative movement with respect to the input means 24. As shown, this rotational mounting can be in the form of an intershaft bearing 28. The intershaft bearing 28 is a suitable conventional bearing which gives the output means 26 both radial and axial position relative to the input means 24 while assuring that the output means 26 is free to operate at the necessary output speed to deliver output power.

In order to have the output means 26 operate at an appropriate, desired rotational speed relative to the input means 24, a differencing means 30 is provided in the differential mechanism 20. The differencing means 30 is supported by the support means 22. And, this differencing means 30 includes a pair of generally spherical elements 32, 34. The two spherical elements 32, 34 are diametrically opposed within the differential mechanism 20 and are substantially identical in construction and actuation. Each of the two spherical elements 32, 34 frictionally engages the input means 24 as well as the output means 26 and is operable to control the relative rotational speed of the output means 26 with respect to the input means 24.

Frictional engagement between the two spherical elements 32, 34 of the differencing means 30 is maintained and regulated by a loading means 33 that is supported by the support means 22 and which directly acts on the differencing means 30 in a plane containing the centers of the two spherical elements 32, 34 and in a direction perpendicular to the central axis 36 of the differential mechanism 20 in that plane. In this manner, the loading forces applied by the loading means 33 are symmetrically applied to the input means 24 as well as the output means 26. Moreover, a balance in loading force is achieved in both the radial and axial directions of the differential mechanism 20 with this arrangement.

Except as otherwise noted below, aluminum is a suitable material from which the various elements of the differential mechanism 20 can be fabricated.

The Support Means

Figure 2:
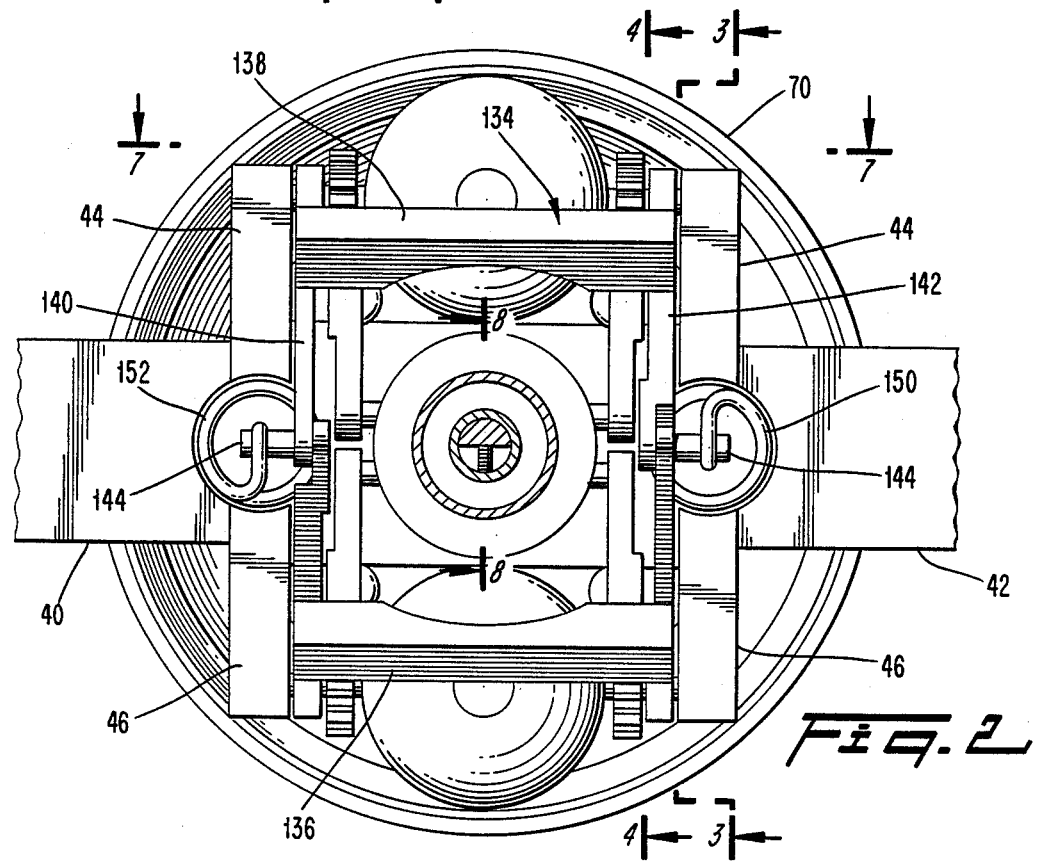
FIG. 2 is a view in partial cross section taken along the line 2—2 of FIG. 1 showing the general spatial relationship between the elements of the differential mechanism.

The support means 22 includes a central support member 38 and a pair of laterally extending lateral support members 40, 42 (see FIG. 2). The two lateral side members 40, 42 are preferably in coaxial alignment with one another such that one lateral side member 40, 42 extends from one side of the central support member 38 while the other lateral side member 40, 42 extends from the opposite side of the central support member 38. Both lateral side members 40, 42 can be provided with suitable conventional devices for mounting the lateral side members 40, 42 to a vehicle frame, such as the frame of a wheelchair or other device. While such devices are not shown, those devices could, for example, be bolt receiving openings, or specially configured mounting flanges.

Each of the two lateral side members 40, 42 is securely attached to the central support member 38, as by welding, for example. Accordingly, when the lateral side members 40, 42 are mounted to the vehicle involved, the lateral side members 40, 42 position the central support member 38 and the entire differential mechanism 20 with respect to that vehicle. Due to the rigid connection between the lateral side members 40, 42 and the central support member 38, the differential mechanism 20 is spatially fixed and the support means 22 is rotationally fixed relative to the vehicle.

The central support member 38 includes two pair of guides 44, 46 and a body portion 48 (see FIG. 3) to which the two pair of guides 44, 46 are integrally connected. Both the upper and lower surfaces of the body portion are undercut to provide recesses 52, 54 (see FIG. 4) in the vicinity of the spherical elements 32, 34. The important condition on the contour of these recesses 52, 54 is that there be a clearance between each recess 52, 54 and the adjacent spherical elements 32, 34. As illustrated, the recesses are described as portions of a spherical surface having a radius which exceeds the radius of adjacent spherical elements 32, 34.

In addition to the recesses 52, 54, the body portion of the support means 22 includes a bore 56. This bore 56 is coaxial with the central axis 36 and has a diameter which is sufficiently large to accommodate a portion of the input means 24. In addition, one end of the bore 56 is provided with a counterbore 58 which receives a mounting bearing 60. The outer race of the mounting bearing 60 is securely connected to the body portion while the inner race of the mounting bearing 60 is connected to the input means 24. As a result, the input means 24 is rotatably mounted by the body portion of the support means 22 so as to be freely rotatable.

Figure 7:
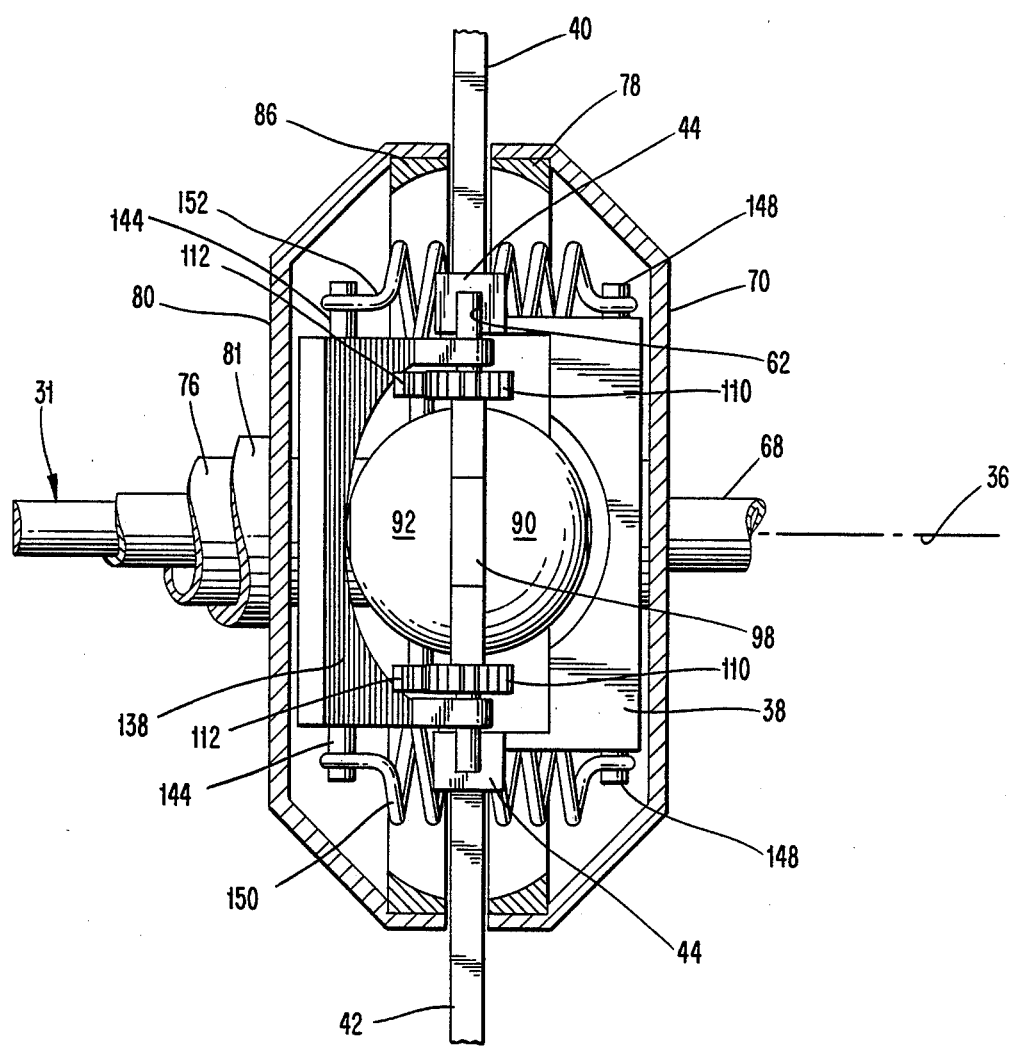
FIG. 7 is a view in partial cross section taken along the line 7—7 of FIG. 2 showing the nested relationship between the support means, the loading means, and the differencing means.

As shown most clearly in FIG. 7, the body portion 38 has a generally C-shaped configuration when viewed from the top. The forwardly extending, laterally positioned portions of the body portion 38 have the pairs of guides 44, 46 attached thereto.

Figure 6:
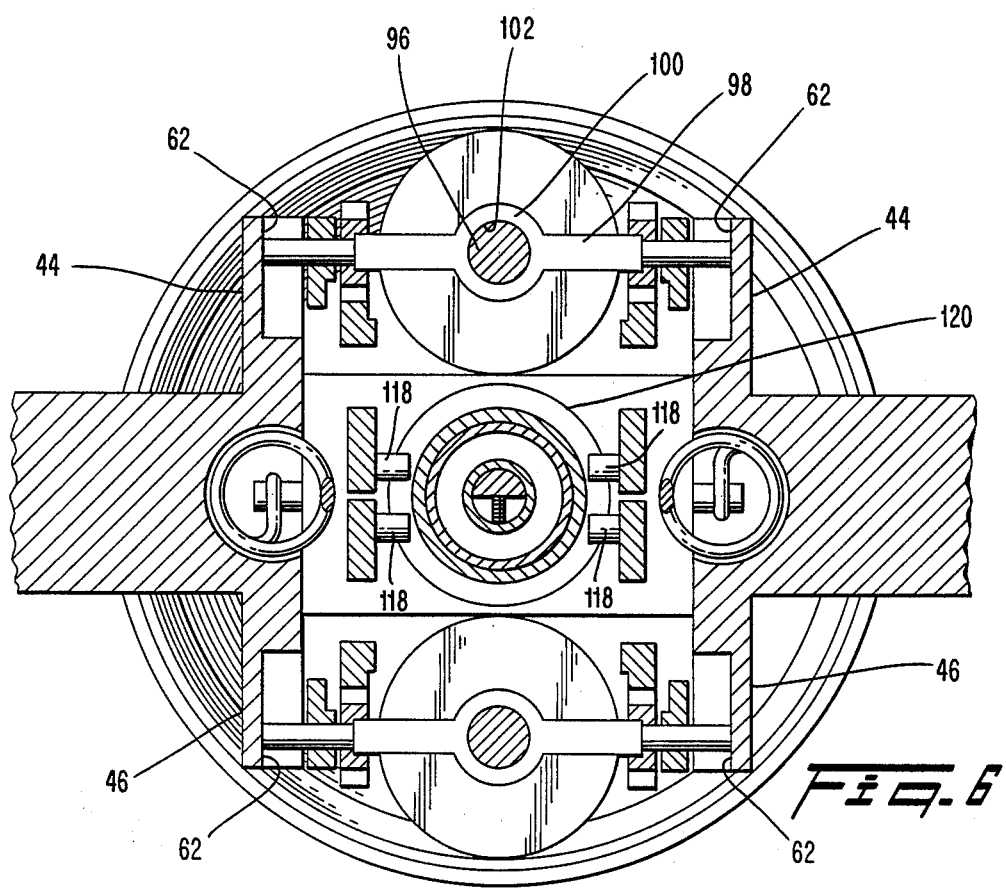
FIG. 6 is a view in partial cross section taken along the line 6—6 of FIG. 3 showing details of the guided support for the differencing means, and the actuation of the differencing means by the control means.

The guides of each pair of guides 44, 46 are spaced apart by a predetermined distance which is sufficient to accommodate the loading means 32 and the differencing means 30. In addition, the guide surfaces of each pair of guides 44, 46 are parallel to one another (see FIG. 2), are equidistantly spaced from the central axis 36, and are generally perpendicular to the central axis 36 (see FIG. 1). Moreover, each guide of the two pair of guides 44, 46 includes a slot 62 (see FIG. 6) with each slot 62 being oriented such that its longitudinal direction is aligned with the longitudinal direction of the corresponding one of the guides 44, 46. Further, the slots 62 are positioned with respect to the corresponding guides 44, 46 such that the slots are symmetrically disposed with respect to a plane passing through the center of the lateral side members 40, 42 (see FIG. 7).

With the foregoing orientation of the slots 62, the differencing means 30 is confined to move in a direction that is purely radial with respect to the central axis 36 in that vertical plane which contains both the central axis and the centers of the spherical elements 32, 34. The longitudinal length of each slot 62 is selected such that the differencing means 30 will still be constrained by the slot when the differencing means 30 is at its radially outermost position and such that the differencing means 30 will not contact the body portion 38 of the central support member 38 when the differencing means 30 is at the radially innermost position. With the foregoing relationship, the slots 62 will provide the necessary guidance for the differencing means 30 without inhibiting the operation of the differencing means 30.

Figure 5:
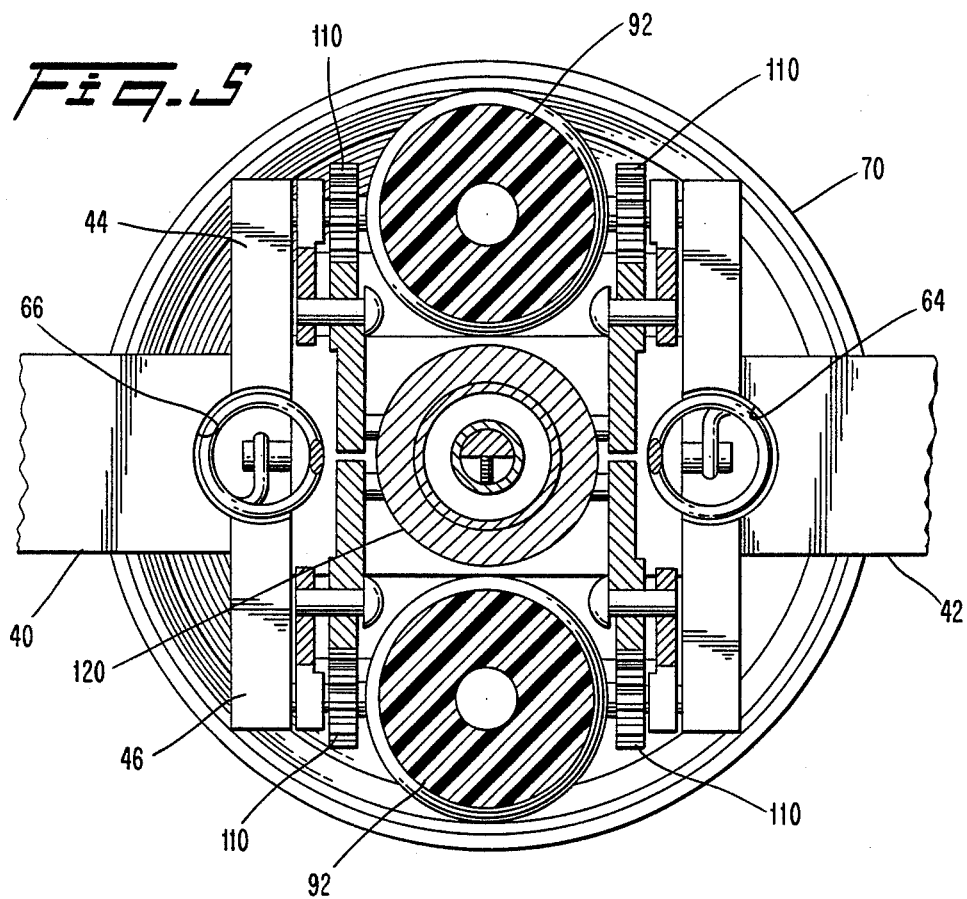
FIG. 5 is a view in partial cross section taken along the line 5—5 of FIG. 1 showing further details of the differencing means.

It will also be noted (see FIG. 5) that an axially extending bore 64, 66 is provided on each side of the support means 22. In particular, each axially extending bore 64, 66 extends through support means 22 with an axis generally parallel to the central axis 36, the central axis 35 and the axes of the bores 64, 66 being in a plane that is perpendicular to the plane containing the centers of the spherical elements 32, 34. The bores 64, 66 pass through the lateral side member 40, 42 and effectively separate the two pair of guides 44, 46. With this arrangement, the bores are symmetrically positioned with respect to the differential mechanism 20.

The Input Means

With reference again to FIG. 1, the input means 24 includes a generally tubular shaft 68 which is coaxially arranged with respect to the central axis 36 and which extends through the differential mechanism 20. Either or both ends of the shaft 68 may be connected to a source of power such as manually operated cranks (not shown). Fixed to the shaft 68 is a power input bell member 70 which is preferably fashioned from a strong lightweight material such as aluminum having a modulus of elasticity exceeding 11 million psi. The input bell member 70 is rotationally symmetric with respect to the central axis 36 and is attached to and rotated directly by the shaft 68.

So that the input bell member 70 will have a portion to directly engage the differencing means 30, the input bell member 70 includes a flange portion 72 having an annular face 74 which is axially offset from the central plane containing the pair of guides 44, 46. The axial offset is selected to be greater than one half of the thickness of the lateral side member 40, 42 so that an axial clearance will be defined between the lateral side member 40, 42 and the annular face 74.

The input means 24 also includes a torque tube 76 which is coaxially arranged with respect to the shaft 68 and the central axis 36. One end of the torque tube 76 is attached directly to the input bell member 70 (see FIG. 4) by a suitable means, as by welding. The other end of the torque tube 76 is normally disposed between the differential mechanism 20 and the end of the shaft 68 such that the shaft 68 projects beyond the end of the torque tube 76. Suitable conventional means may be fixed to the end of the torque tube 76 so that the torque tube 76 can be driven directly by a conventional motor. For example, the end of the torque tube 76 can be provided with a pulley that is belt driven, a spur gear that is driven by a meshed pinion, or any other suitable apparatus to provide power to the torque tube 76.

Since the input bell member 70 is rigidly connected to both the torque tube 76 and the shaft 68, input power for the differential mechanism 20 can be provided from either the shaft 68 or the torque tube 76. For that matter, if it is desireable, then the input power for the differential mechanism 20 can also be provided by the shaft 68 and the torque tube 76 simultaneously.

Disposed within the flange portion 72 of the input bell member 70 is an annular friction ring 78, or driving ring, that is preferably fabricated from a hard material such as steel having a modulus of elasticity of on the order of 30 million psi. If desired, the material of the friction ring 78 may be treated to further enhance its mechanical properties. For example, the friction ring 78 could be further hardened by suitable heat treatment. Alternatively, the inner surface of the friction ring 78 may be hardened, if desired, by any appropriate conventional process.

The friction ring 78 is received by a conformingly shaped seat provided radially and axially inside the input bell member 70. An interference fit between the friction ring 78 and the input bell member 70 holds the friction ring 78 in position.

In addition, the friction ring 78 has a contoured surface facing the differencing means 30 and which is in frictional contact with the spherical elements 32, 34. The contoured surface is configured so that, in cross section, it has essentially the same profile as does a plane through the spherical elements 32, 34 and the line of contact therebetween. However, the contoured surface of the friction ring 78 has a radius which is slightly larger than the radius of the spherical element so that the corners of the friction ring 78 do not dig into the material of the spherical elements.

In this manner the friction ring 78 provides a centralized tractive zone which produces more nearly perfect rolling traction with minimized residual sliding while tending to minimize the abruptness of edge stresses at the edges of the hemispherical portions. Furthermore, the friction ring 78 gives a driving friction force to rotate the spherical elements 32, 34 as the input bell member 70 is rotated by the shaft 68 or the torque tube 76.

To improve the frictional drive between the friction ring 78 and the spherical elements 32, 34, the contoured surface of the friction ring 78 is machined such that residual machining marks are generally radially disposed, i.e., the residual machining marks do not extend circumferentially. This lay of the residual surface markings is important because it also facilitates the operation of the differential mechanism 20 during use.

The axial width of the friction ring 78 is selected to exceed the axial spacing between the hemispherical portions of the spherical elements. With this relationship between the width of the friction ring 78 and the axial spacing of the hemispherical portions, the friction ring will bridge the space between the hemispherical portions when the axis between the hemispherical portions of the differencing means 30 revolves.

The Output Means

The output means 26 includes an output bell member 80 which is rotationally symmetric with respect to the central axis 36. The output bell member 80 is supported directly on the torque tube 76 by the intershaft bearing 28 so as to rotatable relative to the torque tube 76. In addition, the output bell member 80 is directly connected to an output shaft 81 that, in turn, is coaxial with the torque tube 76, the shaft 68, and the central axis 36. The end of the output shaft 81 can be provided with a suitable device for connection with the assembly to be driven by the output side of the differential mechanism 20.

Furthermore, the output bell member 80 includes an axially extending flange portion 82 which terminates in an annular face 84. The annular face 84 of the output bell member 80 is axially spaced from the annular face 74 of the input bell member 70 by a distance which exceeds the thickness of the lateral side members 40, 42. Accordingly, the lateral side members 40, 42 can project laterally from the space defined between the input bell member 70 and the output bell member 80 without interfering with the rotation of either of those members.

The axially extending flange portion of the output bell member 80 is also provided with an axially facing seat which is configured to conform to and to receive a power take-off friction ring 86, or driven ring. This take-off friction ring 86 is preferably fashioned from a hard material having a modulus of elasticity in excess of 30 million psi, such as steel. The take-off friction ring 86 is in all respects identical to the friction ring 78. Accordingly, it is not necessary to repeat all the details of its configuration.

It is, however, appropriate to note at this point that the friction ring 78 and the take-off friction ring 86 do not protrude axially beyond the corresponding annular face 74, 84 of the corresponding input bell member 70 and output bell member 80. Moreover, the friction ring 78 and the take-off friction ring 86 have an axial length which exceeds the axial space between the faces of the input bell member 70 and the output bell member 80. With this arrangement, the friction ring 78 as well as the take-off friction ring 86 will be in driving and driven relationship with the spherical elements 32, 34 of the differencing means 30 regardless of the angular position of the spherical elements 32, 34 relative to the central axis 36.

The Differencing Means

As noted above, the differencing means 30 includes a pair of spherical elements 32, 34. Each of the spherical elements 32, 34 is identical to the other so that it will suffice to describe only one of them in detail, it being understood that the description also applies to the other.

Figure 9:
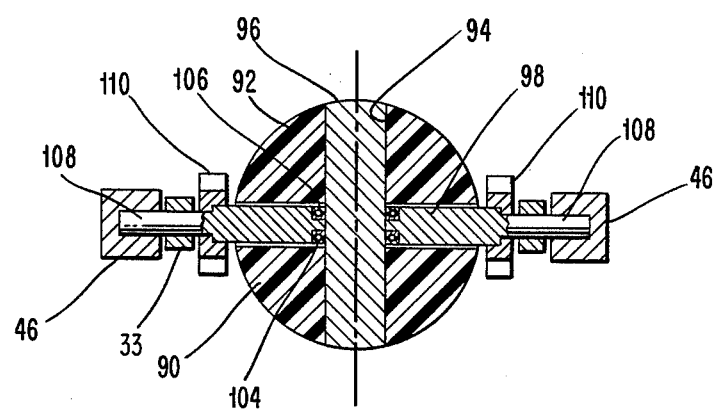
FIG. 9 is a view in partial cross section taken along the line 9—9 of FIG. 1 showing details of the gimballed support for the generally spherical elements of the differencing means.

With reference now to FIG. 9, the construction and arrangement of the spherical elements 32, 34 is better illustrated. Each spherical element 32, 34 includes a pair of generally hemispherical portions 90, 92 fashioned from a structural thermoplastic material such as an acetal resin like "Delrin" which has a modulus of elasticity on the order of 3 million psi. For convenience in description, these portions are referred to as hemispherical even though, as will become apparent, each of the portions 90, 92 is not truly hemispherical since the two portions are spaced from one another and would not describe a perfect sphere if placed together.

Each hemispherical portion 90, 92 has a central bore 94 which is coaxial with a diameter of the corresponding spherical element. The central bore 94 permits the hemispherical portions 90, 92 to be mounted on a cylindrical shaft 96. When the hemispherical portions 90, 92 are attached to the cylindrical shaft 96, the connection is such that the hemispherical portions 90, 92 are nonrotatable with respect to the cylindrical shaft 96 so that one hemispherical portion 90, 92 can transmit power to the cylindrical shaft 96 and the cylindrical shaft 96 can transmit power to the other hemispherical portion 90, 92. Preferably, the cylindrical shaft 96 is fabricated from steel and has a length which is the same as the diameter of the spherical elements 32, 34. Also, the ends of the cylindrical shaft 96 are preferably contoured to the shape of the spherical surface otherwise defined by the spherical elements 32, 34. With the foregoing arrangement, the hemispherical portions 90, 92 and the cylindrical shaft 96 thus cooperate to define part of the spherical surface of the spherical elements 32, 34.

In order to support the spherical elements 32, 34, a gimbal 98 is provided. The gimbal 98 (see FIG. 6) has a radially enlarged central portion 100 which is provided with a mounting bore 102. Each end of the mounting bore 102 is preferably provided with a counterbore that receives a corresponding bearing 104, 106 (see FIG. 9). These bearings 104, 106 mount the cylindrical shaft 96 relative to the gimbal 98 such that the rotational axis of the spherical elements 32, 34, or the ball axis, is arranged perpendicularly to the longitudinal axis of the gimbal 98, i.e., the gimbal axis.

Each end of the gimbal 98 is provided with a generally cylindrical projection 108. Each cylindrical projection 108 is rotatably supported by the loading means 33 and is received in a corresponding slot of the guides 44, 46. The diameter of the cylindrical projection 108 is essentially the same as the width of the slot 62 so that there is adequate clearance to permit the gimbal 98 to move within the slot 62 but in a snubly guided manner. In this fashion, the gimbal 98 can be displaced along the slot and can be rotated within the slot 62 at any particular location.

The portion of the gimbal 98 between the cylindrical projection 108 and the portion 100 (see FIG. 6) may be rectangular in cross-sectional configuration. However, the cross-sectional configuration of this portion of the gimbal 98 may be selected as desired to have other shapes. The importance of the gimbal 98 is to provide adequate structural support for the associated spherical elements 32, 34.

The friction ring 78 and the take-off friction ring 86 are rotationally symmetric about the central axis 36 of the differential means 10, as noted above. Moreover, as noted above, the spherical elements are urged outwardly away from the central axis 36 by the loading means. This combination creates a strong self-centering effect since the spherical shape of the spherical elements is pressed into engagement with the contoured surfaces of the circular friction rings 78, 86, which contoured surfaces present a concave surface in an axial plane (see FIG. 3) and which also present a concave surface in a radial plane (see FIG. 2).

To control the angular position of spherical elements 32, 34 with respect to the differential mechanism 20, each end of gimbal 98 is also provided with a corresponding spur gear or pinion 110. Each pinion 110 is rigidly affixed to the gimbal 98 so that the pinion 110 will rotate with the gimbal 98 and so that rotation of the pinion 110 will cause the gimbal 98 to rotate about the longitudinal axis by a corresponding amount. If desired, the pinion 110 can be located at the transition between the cylindrical projection 108 and body portion of the gimbal 98. With such a location, the cross-sectional configuration of the body portion of the gimbal 98 can be used to prevent relative rotation between the pinion 110 and the gimbal 98. Alternatively, the pinion 110 can be connected to the gimbal 98 with a key to prevent the relative rotation which is to be avoided.

Each pinion 110 meshes with a segment gear 112 (see FIG. 4) which is carried on a corresponding arm or lever 114. The diameter of the pitch circle for teeth of the gear segment is selected to be twice the diameter of the pitch circle for teeth of the pinion 110. Accordingly, movement of the lever 114 through an angle about its pivot shaft 116 causes an angular rotation of the gimbal 98 which is twice as great.

So that all of the levers 114 will operate in unison and provide identical angular displacements to the spherical elements 32, 34, the distal end of each lever 114 is provided with a projection 118 that is received in a circumferential groove of a collar 120. The collar 120 is slidably mounted on the torque tube 76 (see FIG. 4). The depth of the groove in the collar 120 is selected such that the projections 118 of the lever 114 will remain in the groove despite its longitudinal position on the torque tube 76. While the lever 114, the gimbal 98, and the spherical elements 32, 34 are spatially fixed with respect to the support means 22, the collar 120 rotates with the input means 24 and is part of the control means 31.

The Control Means

Figure 8:
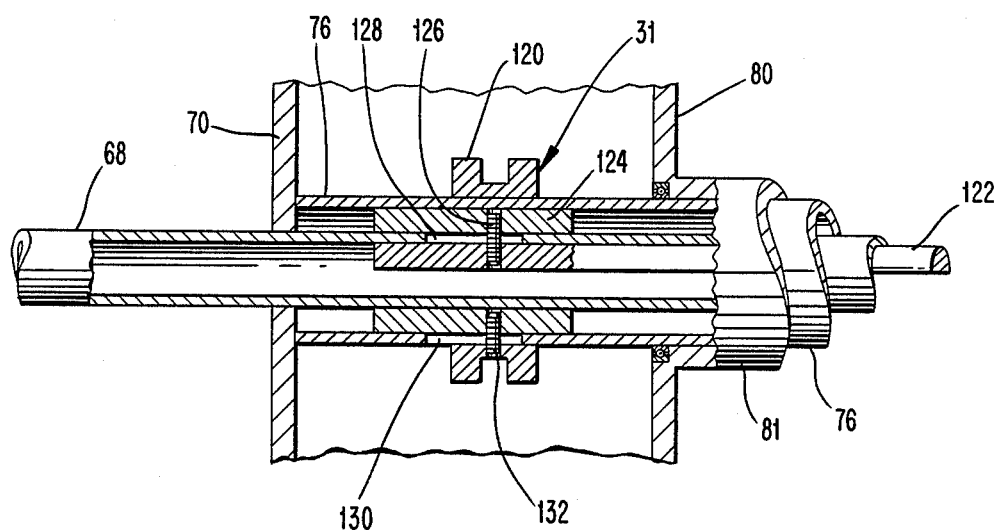
FIG. 8 is a view in partial cross section taken along the line 8—8 of FIG. 2 showing details of the connection between the control means and the differencing means.

In addition to the collar 120, the control means 31 includes a control rod 122 which is located within the input shaft 68 (see FIG. 8). The control rod 122 has a D-shaped cross section so that it can be positioned on one side of the shaft 68. To provide access to the control rod 122, one end of the control rod 122 projects beyond the corresponding end of the shaft 68. Actuation of the control rod 122 can be manual and causes the control rod 122 to slide linearly in the longitudinal direction of the shaft 68.

Linear movement of the control rod 122 is transmitted to a shuttle 124 which is disposed between the shaft 68 and the torque tube 76. This shuttle 124 is slidably mounted on the shaft 68 and is connected to the control rod 122 by a suitable connecting pin 126. The connecting pin 126 passes through a longitudinally extending slot 128 in the shaft 68. Accordingly, the shuttle 124 is free to move longitudinally with the control rod 122 until that movement is limited by interference between the connecting pin and the cooperating slot 128.

Movement of the shuttle 124 is similarly transmitted to the collar 120. To this end, the torque tube 76 is provided with a longitudinally extending slot 130 which has a longitudinal length that corresponds to the length of the slot 128. A connecting pin passes from the collar 120 through the slot 130 and engages the shuttle 124. As a result, longitudinal movement of the control rod 122 moves the shuttle 124 as well as the collar 120. And, as noted above, movement of the collar 120 causes the spherical elements 32, 34 to be rotated in unison about the respective gimbal axes.

The Loading Means

Since frictional contact between the input bell member 70, the output bell member 80 and the spherical elements 32, 34 causes the differential action to occur, it is appropriate to provide a mechanism to give a predetermined level of force loading perpendicularly to the gimbal axes. The loading means 33 provides that force loading independently of the differencing means 30 and the control means 31.

The loading means 33 includes a pair of generally H-shaped frames 134, 136, both of which are identical in construction (see FIG. 2) so that a description of one frame will suffice to describe the other. Each frame 134 includes a cross member 138, a straight leg 140, and a leg 142 with an offset. The offset of the leg 142 is positioned and proportioned such that the straight leg 140 of the other frame can lie in the same plane as the major portion of the leg 142. In addition, a spring support pin 144 is provided to pivotally connect the distal end of a straight leg 140 with the offset portion of the leg 142 from the other frame and also to provide an attachment for a loading spring. The pin 144 may be fixed to either the straight leg 140 or the offset leg 142 with a pivotal connection to the leg to which the pin 144 is not attached. The opposite end of each leg 140, 142 is rotatably mounted on the cylindrical projection 108 of the gimbal 98 for the associated spherical elements 32, 34 (see FIG. 3).

Each leg 140, 142 has a length between the center of the pin 144 and the axis of the corresponding gimbal 98 which is greater than the distance from the centerline 36 to radially outermost position of the gimbal 98. In this manner the loading means will always provide a positive force urging the spherical elements radially outwardly. Moreover, each leg 140, 142 also carries a pivot pin 145 which is connected to the associated leg. The pivot pin 145 provides a pivotal mounting for the lever 114 associated with the corresponding leg. Accordingly, the pin 145 projected inwardly toward the center of the differential mechanism 20. So that the segment gear 112 of each lever 114 will remain in meshed engagement with the corresponding pinion 110, the center of the pin 145 is spaced from the central axis of the gimbal 98 by a distance corresponding to the sum of the pitch radius of the pinion 110 and the pitch radius of the segment gear 112. With the foregoing arrangement of the pinion 110 and the lever 114 coupled with the fact that loading means only experiences slight displacements caused by wear of the spherical element surfaces, the operation of the differencing means is essentially independent of the operation of the loading means.

The cross member 138 of each frame projects generally perpendicularly from the legs 140, 142. This cross member 138 rigidly connects the legs 140, 142 and structurally synchronizes the loading movement of both legs of the H-frame. On the side of the cross member 138 which faces the corresponding spherical elements 32, 34, the surface is shaped so that interference between the cross member 138 and the spherical elements 32, 34 is avoided (see FIG. 4). If desired, the contour of that surface can be spherical as illustrated. Alternatively, the surface can havee any desired shape as long as it does not contact the spherical elements 32, 34.

Each side of the body portion 38 of the support means 22 is also provided with a spring support pin 148 (see FIG. 1). In order to energize the loading means 33 so that the gimbal 98 are urged outwardly along the guide provided by the slots 62, a resilient means such as a tensile spring 150 is mounted such that it engages the spring support pins 144, 148 and extends therebetween. The spring 150 also passes through the opening provided on the corresponding side of the body portion 38 of the support means 22 (see FIG. 2). Moreover, another spring 152 is provided on the opposite side of the body portion 38 of the support means 22 so that balanced forces are applied to both ends of each gimbal 98.

The particular arrangement of the springs 150, 152 and the scissors-like manner in which the loading force is applied to the gimbal 98 in combination with the floating arrangement provided by the combination of the cylindrical projection 108 of the gimbal 98 in the slots of the support means 22 permits the entire loading means 33 to adjust so that the same loading force is applied to each spherical element 32, 34. Another important function of this symmetrical scissors-like loading arrangement is that it maintains the parallel relationship between the two radially opposed axes of the gimbal 98. The parallelism is highly beneficial to the synchronized operation of the two spherical elements.

OPERATION

Initially, the differential mechanism 20 of the present invention is mounted to a vehicle, such as a wheelchair, by attaching the lateral side member 40, 42 (see FIG. 2) to the frame of the vehicle. Appropriate cranks are provided for the ends of the shaft 68 (see FIG. 1). In addition, an appropriate motor assembly carried by the frame is drivingly connected with the end of the torque tube 76. To permit the vehicle to be steered by the differential mechanism 20, the control rod 122 of the control means 31 is connected to a suitable assembly to permit the linear steering input to be provided to the differential mechanism 20. And, the input means 24 is connected with one of the driven members of the vehicle while the output bell member 80 is connected to a different one of the driven members of the vehicle.

Power to move and maneuver the vehicle can then be supplied by rotating the shaft 68 or by driving the torque tube 76. Since the shaft 68 and the torque tube 76 are both connected through the input bell member 70, the input power can be supplied by either the shaft 68 or the torque tube 76. Because the torque tube 76 is intended to be driven at rotational speeds which generally conform to the rotational speed that will be attained by the shaft 68 when manually rotated, it is also within the scope of this invention to use the torque tube 76 and the shaft 68 simultaneously to drive the input means 24.

Torque which is input to the input means 24 is transmitted through the input bell member 70 to the annular friction ring 78. Since the spherical elements 32, 34 are urged into frictional engagement with the friction ring 78 by the loading means 33, torque is transmitted from the friction ring 78 to the hemispherical portions 90, 92 in contact therewith. In the position of the spherical elements 32, 34 illustrated in FIG. 1, the torque introduced through one of the hemispherical portions 90, 92 is transmitted through the cylindrical shaft 96 to the other of the hemispherical portions 90, 92 of each spherical element 32, 34. As noted, the connections between the two hemispherical portions 90, 92 and the cylindrical shaft 96 of each spherical element 32, 34 is arranged so that torque will be transmitted.

The take-off friction ring 86 of the output means 26 is also in frictional engagement with the two spherical elements 32, 34. Accordingly, when the spherical elements 32, 34 rotate in response to the input torque, rotation is transmitted to the take-off friction ring 86 and the output bell member 80. When the spherical elements 32, 34 have the position shown in FIG. 1, the output bell member 80 is driven at the same rotational speed as the input bell member 70. That is to say, the differencing means 30 allows both the input and the output of the differential mechanism 20 to operate at the same rotational speed. For this condition to occur, the axes of the cylindrical shaft 96 of each spherical elements 32, 34 are oriented so as to be parallel to the central axis 36 of the differential mechanism 20.

At this point it is also convenient to note the importance of the manufacturing process used to fabricate the contoured surfaces of the friction ring 78 and the take-off friction ring 86. More specifically, by fabricating the contoured surfaces of the friction ring 78 and the take-off friction ring 86 such that the lay of residual machining tool marks is arranged to be generally parallel to the central axis, those residual tool marks on the friction ring 78 and the take-off friction ring 86 serve to enhance the frictional engagement between the friction ring 78, the take-off friction ring 86 and the hemispherical portions 90, 92 of the spherical elements 32, 34. Moreover, as will become apparent from the following discussion, that radial orientation of the residual tooling marks does not generate a resistance to changes in orientation of the axes of the cylindrical shaft 96 in the spherical elements 32, 34 relative to the central axis 36 of the differential mechanism 20. If the residual tooling marks are oriented in a circumferential direction, then a resistance to changes in orientation of the axes of the cylindrical shaft 96 in the spherical elements 32, 34 does actually occur.

It is also convenient to note at this point that the materials used in the friction ring 78, the take-off friction ring 86 and the hemispherical portions 90, 92 of the spherical elements 32, 34 are important. By selecting the material of the hemispherical portions 90, 92 so that it has a modulus of elasticity substantially less than the modulus of elasticity of the friction ring 78 and the take-off friction ring 86, the surface of the hemispherical portions 90, 92 will deform elastically to accommodate the surface imperfections left on the friction ring 78 and the take-off friction ring 86 during manufacture. Here again, the result is to increase the ability of the contact between the hemispherical portions 90, 92 and the friction ring 78 as well as the take-off friction ring 86 to transmit torque. Furthermore, to the extent that any of the surfaces will be subjected to wear due to the frictional transmission of torque, the lower modulus of elasticity for the hemispherical portions 90, 92 will cause those portions to be preferentially subjected to wear. Where the hemispherical portions 90, 92 are fabricated from a structural thermoplastic material such as "Delrin", the hemispherical portions 90, 92 are relatively inexpensive and can be readily replaced.

When it is desired to introduce a rotational speed difference between the input means 24 and the output means 26, the cylindrical shaft 96 is moved axially. As the cylindrical shaft 96 moves axially with respect to the shaft 68, the axial movement is transmitted to the shuttle 124 (see FIG. 8) and to the collar 120. As a result, the collar 120 translates along the torque tube 76 by an axial distance corresponding to the distance through which the cylindrical shaft 96 was originally moved.

As the collar 120 translates, cooperation between the circumferential groove of the collar 120 and the projections carried by the four levers 114 causes the four levers 114 to rotate about their respective pivot shafts 116. Simultaneously, the segment gear 112 carried by each lever 114 causes the corresponding meshed pinion 110 to rotate. The pinion 110, in turn, orients the gimbal 98 to a new position so that the axis of the cylindrical shaft 96 of each spherical element 32, 34 is inclined relative to the central axis 36. When the axis of the cylindrical shaft 96 is so inclined, the location of driving contact between the friction ring 78 and the spherical elements 32, 34 as well as the location of driven contact between the take-off friction ring 86 and the spherical elements 32, 34 changes. Since the spherical elements 32, 34 rotate at an angular velocity determined by the input bell member 70, the difference in radii between the driving contact location and the driven contact location will determine the ratio between the input angular velocity and the output angular velocity.

The engageable arc length of the segment gear 112 is selected such that, as the collar 120 moves to the right, each pinion 110 can be rotated through an angle exceeding 90 degrees relative to the position illustrated in FIG. 4 and such that, as the collar 120 moves to the left, each pinion 110 can be rotated through an angle exceeding 30 degrees relative to the position illustrated in FIG. 4. Accordingly, since each pinion 110 is fixed to a corresponding one of the spherical elements 32, 34, the orientation of the spherical elements 32, 34 (as shown in FIG. 4) can also be rotated through a corresponding angle. In addition, the connection of the lever 114 and the segment gear 112 is determined such that the segment gear 112 can actually effect such an angular excursion as is necessary to provide the angular rotation of the pinion 110, and thus the spherical elements 32, 34. When the differential mechanism 20 is used in a wheelchair, the desired angular excursions of the spherical elements 32, 34 correspond generally to the range of rotational movement available from the wrist of a person.

Assuming that the input means 24 is operatively connected with a wheel assembly on the right side of a vehicle as the vehicle is moving forward and that the output means 26 is operatively connected with a wheel assembly on the left side of a vehicle as the vehicle is moving forward, as the collar 120 moves to the left in FIG. 4, the rotational speed of the output means 26 increases relative to the rotational speed of the input means 24. Accordingly, the vehicle will negotiate a curve to the right. Conversely, as the collar 120 moves to the right in FIG. 4, the rotational speed of the output means 26 decreases relative to the rotational speed of the input means 24. And, the vehicle will negotiate a curve to the left.

The sharpness of the curve, either left or right, is determined by the displacement of the collar 120 from the neutral position, i.e, that position shown in FIG. 4 where the ratio of the output angular velocity to the input angular velocity is 1.0 and the central axes of the gimbals are parallel to the central axis 36 of the differential means 20. When the spherical elements 32, 34 are oriented such that their rotational axes are only slightly inclined relative to the central axis 36, then the vehicle will negotiate a gradual curve. On the other hand, as the spherical elements 32, 34 are oriented such that their rotational axes approach perpendicularity with the central axis 36, then the vehicle will negotiate a very sharp curve.

It is also contemplated that the axis of the cylindrical shaft 96 of each spherical elements 32, 34 can move to a position where it is perpendicular to the central axis 36 as the collar 120 moves to the right. When the perpendicular relationship between the axis of the cylindrical shaft 96 and the central axis 36 exists, the output bell member 80 rotates in the opposite direction from the input bell member 70 and at an equal (but opposite) angular velocity. Under such conditions, the differential mechanism 20 of the present invention permits the associated vehicle to turn about a vertical axis which is centered between the wheels, a maneuver referred to as "turning in place".

THE SECOND EMBODIMENT

It will, of course, be appreciated by those skilled in the art that the differential mechanism 20 described above in connection with the first embodiment may have some features that could be awkward in certain applications. Some of the features that may find themselves in this category are the multipart spherical element assembly, the multipart input bell assembly, the multipart output bell assembly, and the coaxially disposed control means. In addition, there are some other features such as power steering that may be desireable for some applications. The second embodiment of the differential mechanism 20 illustrated in FIGS. 10-15 provides alternatives of the foregoing type.

In concept, the first and second embodiments are generally the same. For example, the second embodiment includes a support means 22 (FIG. 10) for attaching the differential mechanism 20 to a vehicle. An input means 24 (FIG. 11) and an output means 26 are rotatably supported relative to one another and are generally supported by their mounts to the associated vehicle. (Note that the positions of the input means 24 and the output means 26 in FIG. 11 are reversed from the positions of these features in the first embodiment described above in connection with the first embodiment.) Since the input means 24 and the output means 26 are supported by the vehicle, with the support means 22 also attached to the vehicle the vehicle itself provides reaction force to hold elements of the differential mechanism 20 in the proper radial and axial position.

The input means 24 can be driven either manually or by a powered device. Moreover, the input means 24 can be driven from either side of the differential mechanism 20 since the input shaft 200 extends coaxially through the entire differential mechanism 20. In this second embodiment, the shaft 200 may be a solid shaft or may be an tubular one, depending on the preference of the designer.

The output means 26 is rotatably mounted on the shaft 200, for example by suitable conventional intershaft bearings. Relative angular velocities of the input means 24 and the output means 26 are regulated by the differencing means 30 (FIG. 10). As with the first embodiment, the differencing means 30 of the second embodiment also includes a spherical element rotatable about an axis which can be adjusted about the axis of an associated gimbal in the plane of the central axis 21 (FIG. 11) of the differential mechanism to effect regulation of the relative angular velocities of the input means 24 and the output means 26.

A loading means 33 (FIG. 10) supported by the support means 22 provides the necessary force to assure engagement of the differencing means 30 with the input means 24 and the output means 26. The loading means 33 has resilient devices which compensate for wear of various elements of the differential mechanism 20.

The Input Means

The input means 24 (FIG. 11) includes the shaft 200 which extends coaxially through the differential mechanism 20 (FIG. 14). An input bell member 202 is nonrotatably attached to the shaft 200 so that the shaft 200 and the input bell member 202 rotate simultaneously. The input bell member 202 is essentially the same as the input bell member 80 described above in connection with the first embodiment. Accordingly, common features of these two similar members will not be described again.

On the concave side of the input bell member 202 is an input gear 204. This input gear 204 is part of a power steering means 210. The input gear 204 may be integral with the input bell member 202, may be a separate element securely attached to the input bell member 202 so as to be concentric with the input bell member 202, or may be connected directly to the shaft 200 so as to be nonrotatable relative to the shaft 200. The diameter of the input gear 204 is greater that the diameter of the shaft 200 so that the shaft 200 can be coaxially located relative to the input gear 204.

At the circumferential edge of the input bell member 202 is a friction ring 201. This friction ring 201 has an axial width that is less than the axial width of the corresponding friction ring in the first embodiment. But, unlike the friction ring of the first embodiment, the friction ring 201 may be integral with the input bell member 202 and machined from the same parent as the input bell member 202. When the friction ring is fashioned from the same material as the bell member, the surface of the friction ring is preferably given a hardening treatment, such as hard anodizing where the member is made of aluminum or nitriding if steel is used. Basically, the various parts of the differential mechanism can be made from suitable engineering metals having modulii of elasticity in the range of 10-30 million psi.

The Output Means

As with the input means 24, the output means 26 includes an output bell member 206 which is similar to the output bell member described above in connection with the first embodiment. An output shaft 208 is connected to the output bell member 206 so as to be coaxial with the shaft 200. The output shaft 208 may be mounted on the shaft 200 with suitable intershaft bearings. In addition, the output means 26 includes a take-off friction ring 212 with an axial width that is similar to that of the friction ring 201. As with the friction ring 201, the width of the take-off friction ring 212 is less than the width of the corresponding take-off friction ring in the first embodiment. And, the take-off friction ring 212 may be fabricated along with the output bell member from a single piece of material with a suitably hardened surface.

The Support Means

The support means 22 (FIG. 10) includes a pair of lateral side members 214, 216. Each of the lateral side members 214, 216 extends outwardly through an axial space 215 defined between the end flanges of the input bell member 202 and the output bell member 206 (FIG. 11). Each of the lateral side members 214, 216 can be connected to the vehicle in any suitable conventional fashion. In addition, each of the lateral side members 214, 216 is connected at one end to a corresponding side of a support body 216 that is located in the concavity defined by the input bell member 202 and the output bell member 206. As can be seen (FIG. 10), the support body 216 has a U shape when viewed from the axial direction. With this shape, the center portion of the volume circumscribed by the support body 216 is open.

The support body 216 has a pair of side guides 218, 220. Each of these side guides 218, 220 includes a corresponding guide slot 222, 224 (FIG. 12) on the side facing the central axis 203 of the differential mechanism 20. The guide slots 222, 224 are arranged so that their longitudinal extent is generally perpendicular to the central axis 203. In this manner the guide slots 222, 224 can guide movement of the loading means 32 so that the loading means exerts a radially outwardly directed force on the differencing means 30.

One of the side guides 218 of the support body 216 has a pair of arms 226 (FIG. 10) which extend from the associated side guide 218 toward the central axis 203. This pair of arms 226 provides stationary support for an externally threaded rod 227 (FIG. 13) which is part of the power steering means 210. The threaded rod 227 may be hollow, as shown, and is securely attached at each end to a corresponding one of the two arms 226.

The Loading Means

Figure 12:
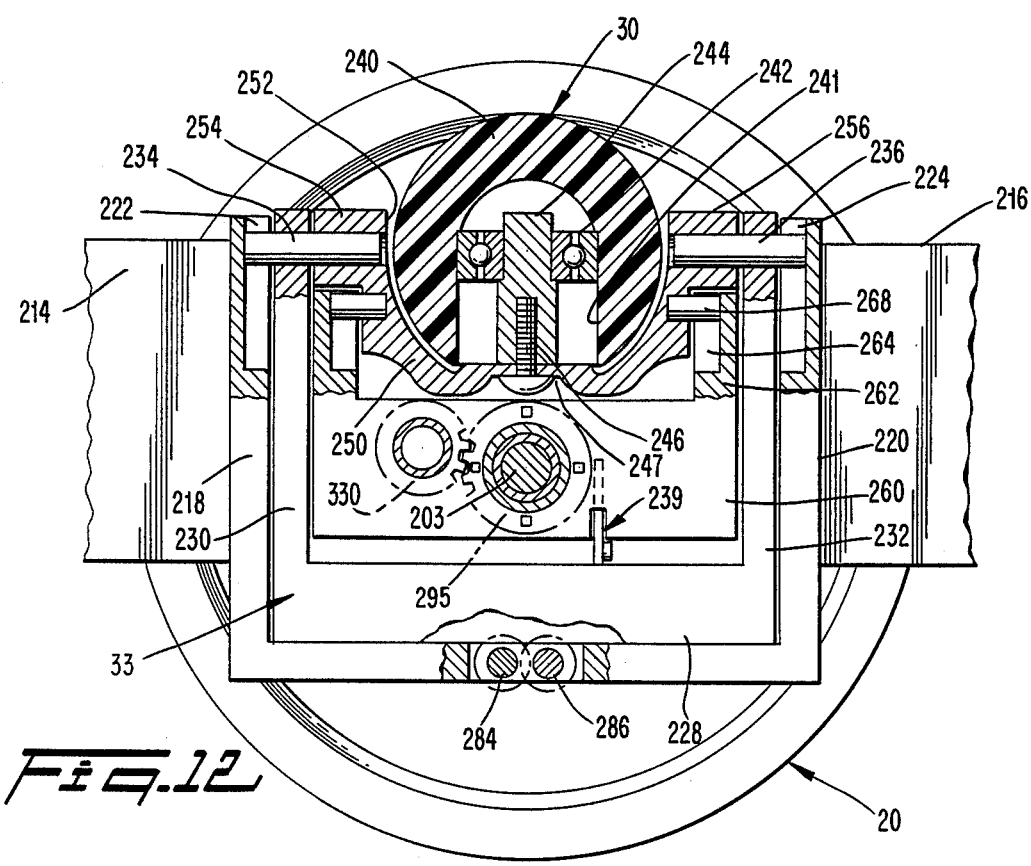
FIG. 12 is a side elevational view in partial cross section view generally along the line 12—12 of FIG. 11 with portions broken away to expose further details of the invention.

The loading means 33 (FIG. 10) includes a generally U-shaped loading frame 228 having a pair of generally parallel arms 230, 232. Each arm 230, 232 has a bore that receives a corresponding gimbal axis guide pin 234, 236 (FIG. 12). One end of each pin 234, 236 projects outwardly away from the corresponding arms 230, 232 and is received in a corresponding one of the guide slots 222, 224. Preferably, the diameter of the pin 234, 236 corresponds to the width of the corresponding guide slot 222, 224 so that the pin 234, 236 can slide in and be guided by the corresponding guide slot 222, 224. Each guide pin 234, 236 is secured to the corresponding arm 230, 232 of the loading frame 228 so as to be rotationally fixed with respect thereto. With this centralized mount, the guide pin 234, 236 is stiffened relative to a cantilever-type mounting arrangement.

In the portion of the loading means 33 which extends between the arms, there is an axially oriented slot 238 (FIG. 11). The slot 238 is positioned such that it is generally in alignment with a control linkage 239. The slot 238 is positioned on one side of the central axis 203 (FIG. 12) and is sized so that it provides clearance around the control linkage 239 which extends partially into the slot. The clearance between the slot 238 and the control linkage 239 is sufficient to permit the loading means 33 to pivot slightly around the guide pins 234, 236 without coming into engagement with the control linkage 239.

The loading means 33 also includes a pair of tensile springs 229 (FIG. 11), each spring 229 being located on a corresponding side of the loading frame 228 (FIG. 14). One end of each spring is connected to the loading frame 228 adjacent to the side of the loading frame 228 so that the spring 229 will be positioned away from the central area of the differential mechanism 20. The second end of each spring is connected to the support body 216 of the support means 22 such that the spring is extended. With the foregoing arrangement, the spring 229 resiliently biases the loading frame 228 to rotate about the guide pins 234, 236 at the end of each arm 230, 232. Moreover, since the loading frame 228 slides axially along the surface of the support body 216, and since the guide pins are captured in the corresponding guide slots 222, 224 (FIG. 12) of the support means 22, the loading frame 228 will exert a radial force on the guide pins and any structure carried by those pins.

The Differencing Means

The differencing means 30 of the second embodiment is considerably different than the differencing means of the first embodiment. In this second embodiment, the differencing means 30 (FIG. 12) includes a single spherical element 240. The spherical element 240 is fabricated from a suitable structural plastic such as "Delrin" and can be fashioned as a ball and then machined as necessary to provide the appropriate features for use in the differencing means 30. The spherical element 240 has a bore 241 which is aligned with a diameter of the sphere. The diameter of the bore 241 must be selected such that the axis of the spherical element 240 can be rotated about the axis defined by the guide pins 234, 236 through the angle needed to give the designed range of ratios of output angular velocity to input angular velocity while assuring that there is frictional engagement between the spherical element 240 and the friction rings 201, 212.

To rotatably support the spherical element 240, a suitable bearing 242 is mounted in and retained in the bore 240. This bearing 242 is located such that the central plane of the bearing is both perpendicular to the axis of the bore 240 and coplanar with a plane containing the center of the spherical element 240. With this location, the single bearing 242 can provide the radial support for the spherical element 240 regardless of its orientation relative to the input bell member 202 and the output bell member 206.

The bearing 242 is itself supported by a mount 244. The bearing mount 244 may be generally cylindrical in configuration and is coaxially mounted in the bore 241 by the bearing. One end of the bearing mount 244 has an internally threaded opening which receives a conformingly threaded bolt 246. The bolt 246 passes through an opening in a gimbal 250 and serves to attach the spherical element 240 to the gimbal 250 so that the spherical element 240 can rotate about the axis of the bore 241.

The gimbal 250 is generally U-shaped (FIG. 12) and has a pair of pivot ends 254, 256 which project away from the main portion of the gimbal 250. In addition, the gimbal 250 has an exterior surface 252 with a generally cylindrical configuration. The diameter of this generally cylindrical surface 252 exceeds the diameter of the spherical element 240 so that the spherical element 240 can be mounted on the gimbal 250 without contacting the surface 252. If desired, the surface 252 of the gimbal could have other shapes that might be more convenient from machining considerations as long as the spherical element 240 is free to rotate without contacting the surface.

At the location on the gimbal 250 where the bolt 246 passes through to the mount 244, the gimbal 250 is provided with a recess 247 (FIG. 12). This recess 247 is positioned in alignment with the bore 241 and is adjacent to a portion of the gimbal 250 which protrudes into the sherical contour of the element 240 removed by the bore 241. Thus the length of the protruding portion of the gimbal must be less than the diameter of the bore 241. This arrangement serves to stiffen the structure of the gimbal 250. In addition, the recess 247 and adjacent portion of the gimbal 250 effectively shorten the length of the bearing mount 244 that is required to properly position the center of the spherical element 240 relative to the gimbal axis. Since the spherical element 240 is cantilever mounted on the gimbal 250, and since the stiffness of a cantilever mount is a strong function of the length of the mount, the length of the bearing mount 244 determines the stiffness of the connection between the spherical element 240 and the gimbal 250.

Each pivot end 254, 256 of the gimbal 250 (FIG. 12) includes a bore that rotatably receives a corresponding one of the guide pins 234, 236. The bores in the pivot ends 254, 256 are coaxial with one another and are positioned so that the center of the spherical element 240 will lie on the axis of these bores without contacting the external surface 252 of the gimbal 250. By sizing the bores so that the pins have a running clearance, the gimbal 250 is rotatably mounted on the guide pins 234, 236. It will also be noted that the axis of the mounting bores in the pivot ends 254, 256 is perpendicular to the axis of the bore 240 in the spherical element 240. This geometric relationship is important to the proper operation of the differential mechanism 20.

Beneath the gimbal 250 (FIG. 10) is a control plate 260 which is operated by the power steering means 210 (FIG. 11). The control plate 260 includes at least one extension 262 (FIG. 10) that projects towards a corresponding pivot ends 254, 256 of the gimbal 250. The control plate 260 is proportioned so that it will fit within the loading frame 228 without touching the loading frame 228 and so that the gimbal 250 can rotate about the gimbal axis without touching the control plate 260.

Preferably, each side of the control plate 260 includes an extension so that the control plate 260 is restrained from rotation about the central axis of the differential mechanism 20 in a simple, straightforward manner. Each extension includes a guide channel 264 (FIG. 12) which is oriented perpendicularly to the central axis 203. The length of each guide channel is selected to permit the gimbal 250 to rotate through a predetermined angle about the gimbal axis. In the present embodiment, this angle is selected to be about 120 degrees.

In addition, each guide channel 264 receives the end of a corresponding guide pin 268 that is securely attached to the gimbal 250 (FIG. 12). The surface engages the bottom of the corresponding guide channel 264 so that the control plate 260 will be restrained from rotation about the central axis but so that the guide pins 268 will also be free to slide longitudinally in the guide slots. The guide pins 268 are coaxial and are located at a predetermined radial distance from the gimbal axis (FIG. 12). The radial distance from the gimbal axis to the guide pin 268 is selected such that torque expanders 294, 296 can be engaged at the extreme ends of the travel of the control plate 260 along the central axis 203. Accordingly, when the control plate 260 is translated along the central axis, cooperation between the guide pins 268 and the guide channels 264 will cause the gimbal 250 to rotate about the gimbal axis.

The angular position of the guide pins 268 relative to the gimbal axis is also significant. More particularly, the angle between (a) a radial line passing through the axis of the guide pins 268 and the gimbal axis and (b) the axis of the bore 241 is selected so that the gimbal 250 and spherical element 240 can achieve a position where the axis of the bore 241 is radially aligned with and perpendicular to the central axis of the differential mechanism 20. In this orientation, the input bell member 202 and the output bell member 206 will turn in opposite directions with equal but opposite angular velocities.

The radial distance from the gimbal axis to the axis of the guide pins 268 is selected so that the gimbal 250 can rotate through a predetermined angle about the gimbal axis. In the present invention, that angle is selected to be 120 degrees. With this value, the gimbal 250 can attain the position shown in FIG. 12 where the input bell member 202 and the output bell member 206 rotate in equal but opposite directions, i.e., the ratio of the angular velocity of the output bell member 206 to the angular velocity of the input bell member 202 is −1. In addition, the gimbal 250 can attain a position rotated 90 degrees about the gimbal 250 axis where the axis of the bore 241 is parallel to the central axis and where the input bell member 202 and the output bell member 206 operate at equal angular velocities in the same direction, i.e., the ratio of the angular velocity of the output bell member 206 to the angular velocity of the input bell member 202 is 1. And by rotating the gimbal 250 to the extreme angular position of 120 degrees from the position illustrated in FIG. 12, the input bell member 202 and the output bell member 206 operate in the same rotational direction but the ratio of the angular velocity of the output bell member 206 to the angular velocity of the input bell member 202 is greater than 1.

The Power Steering Means

Broadly speaking, the power steering means 210 (FIG. 11) uses torque from the input shaft 200 to provide the energy needed to rotate the gimbal 250 about the gimbal axis. The control plate 260 is caused to translate along the central axis of the differential mechanism 20 by establishing clutch-like engagement between one of two counterrotating assemblies and a rotatable nut that can move along a rotationally fixed tubular screw. The assemblies which permit this arrangement will now be discussed.

The input gear 204 of the input means 24 is in meshed engagement with a pinion 280 that may be cantilever mounted on one end of an input pinion shaft 282 (FIG. 11). This input pinion shaft 282 is journal mounted in the support body 216 so as to be rotatable. The support body 216 (FIG. 14) has a centrally located opening 283 which is symmetrically located relative to a plane of symmetry which includes the central axis of the differential mechanism. In the portion of the input pinion shaft 282 which extends through the opening 283, an axially extending direction reversal pinion 284 is provided. This direction reversal pinion 284 is in meshed engagement with a second direction reversal pinion 286 which is carried on an output pinion shaft 288 that also extends through the opening 283. The second direction reversal pinion 286 has the same diameter and the same axial length as the first direction reversal pinion 284.

The output pinion shaft 288 is parallel to the input pinion shaft 282 and is journal mounted in the support body 216 so as to be rotatable. Moreover, the centerline of the input pinion shaft 282 and the centerline of the output pinion shaft 288 are both spaced the same distance from the plane of symmetry which includes the central axis of the differential mechanism 20 and the center of the meshed teeth of the two direction reversal pinions 284, 286. With the foregoing relationship, the input pinion 280 can be in meshed engagement with the input gear 204 while an output pinion 290 cantilever mounted on the end of the output pinion shaft 288 is simultaneously in meshed engagement with a reversed gear 292 (FIG. 11). The output pinion 290 has the same diameter as the input pinion 280 and is in all material physical respects the same as the input pinion 280.

The reversed gear 292 may be mounted on the shaft 200 by a suitable intershaft bearing so that the reversed gear 292 is rotatable relative to the shaft 200 at a location just inside the output bell member 206. Preferably, the reversed gear 292 has a diameter which is the same as the diameter of the input gear 204. With this relationship between the input gear 204 and the reversed gear 292, the rotational speed of the reversed gear 292 will be the same as the rotational speed of the input gear 204 but the direction of rotation will be opposite. Both the input gear 204 and the reversed gear 292 are connected to a corresponding axially extensible torque transmitting means 294, 296.

Each of the torque transmitting means is operable to extend to the control plate 260 from the corresponding one of the input gear 204 and reversed gear 292. Moreover, each of the torque transmitting means 294, 296 is operable to be contracted so that the control plate 260 can move to the axial limit of its predetermined axial travel without being impeded by the torque transmitting means. Furthermore, each torque transmitting means carries a clutch face 302 (see for example FIG. 15) that is engageable with a corresponding clutch face on a rotatable gear 295 (FIG. 11) carried by the control plate 260. Each clutch face 302 (FIG. 15) has a plurality of equiangularly spaced teeth 304 each of which has a radially oriented abutment face 306 and an inclined back face 308. The inclined back face 308 is arranged at an acute angle to the abutment face 306 and is likewise radially oriented. The acute angle is selected so that a parallel surface will be frictionally locked and will not be cammed axially out of engagement with the clutch teeth 304. With this arrangement, the clutch teeth will engage regardless of the direction of rotation of the corresponding torque extension means.

It will be noted that there is a clutch face on each side of the rotatable gear 295, such that a clutch face fronts the clutch face on the corresponding one of the torque transmitting means. On each face of the rotatable gear 295 (FIG. 12) fronting the clutch face of one of the torque transmitting means, the teeth are opposed to the teeth on the clutch face 302 of the torque transmitting means.

Each of the torque transmitting means 294, 296 is built up of a plurality of segments 310, 312 (FIG. 15), the segment 312 includes the clutch face 302. Each segment 310, 312 includes a collar 315 and a plurality of circumferentially spaced legs 314, e.g.,. four, each of which extends axially from the collar 315 of the segment toward the adjacent segment 310. Each collar 315 is generally annular and has an inside diameter which slightly exceeds the diameter of the shaft passing through the differential mechanism so that the collar is freely rotatable with respect thereto.

The legs 314 engage radially extending abutments of the justaposed legs of the adjacent segment 310. Accordingly, when torque is applied to one segment, that torque is transmitted by the legs to abutting radial surfaces of the legs of the next segment in the torque transmitting means. Furthermore, since the legs 314 can slide axially outside of the collar 315 of the adjacent segment, the torque transmitting means can be extended or contracted in the axial direction and still provide the desired torque transmitting function. Each leg 314 may be provided with a suitable detent device to prevent the collar 315 of one segment from being disengaged from the legs 314 of the adjacent element. While various such detents will come to mind, it would be possible to use a simple inwardly projecting lip on the end of each leg that overlaps the collar of the adjacent element.

In order to control which of the two torque transmitting means clutch faces is moved into engagement with the rotatable gear, the clutch collar 313 of the element 312 has an annular groove 317 which receives a corresponding pin carried by the linkage assembly 239 (FIG. 11). The linkage assembly 239 includes a pair of levers 320, 322 each of which is pivotally connected to a tab 326 provided for this purpose on the body portion 216 of the support means.

To assure that the two levers 320, 322 work in unison, a tie link 324 is provided. In addition, the bottom edge of the control plate may be provided with a recess 328 to accommodate the levers 320, 322 at the extreme ends of the travel of the control plate 260. The tie link 324 is pivotally connected to the levers 320, 322 such that the distance between the pivotal connections with the levers is the same as the distance between the pivot connections of the levers to the tab 326. With this arrangement, the pins carried at the distal ends of the levers 320, 322 will move with a constant spacing between them.

The axial spacing between the pivots for the levers 320, 322 is selected such that it is slightly greater than the sum of (a) the axial width of the rotatable gear 295, (b) twice the axial length of the clutch teeth 304, and (c) twice the distance from the clutch face to the middle of the corresponding circumferential groove 315. With this arrangement, both of the torque extension means can be continuously rotating without causing rotation of the gear 295. However, when the tie link 324 is moved in one direction or the other, then one of the torque extension means 294, 296 is engaged and rotates the gear 295.

Figure 13:
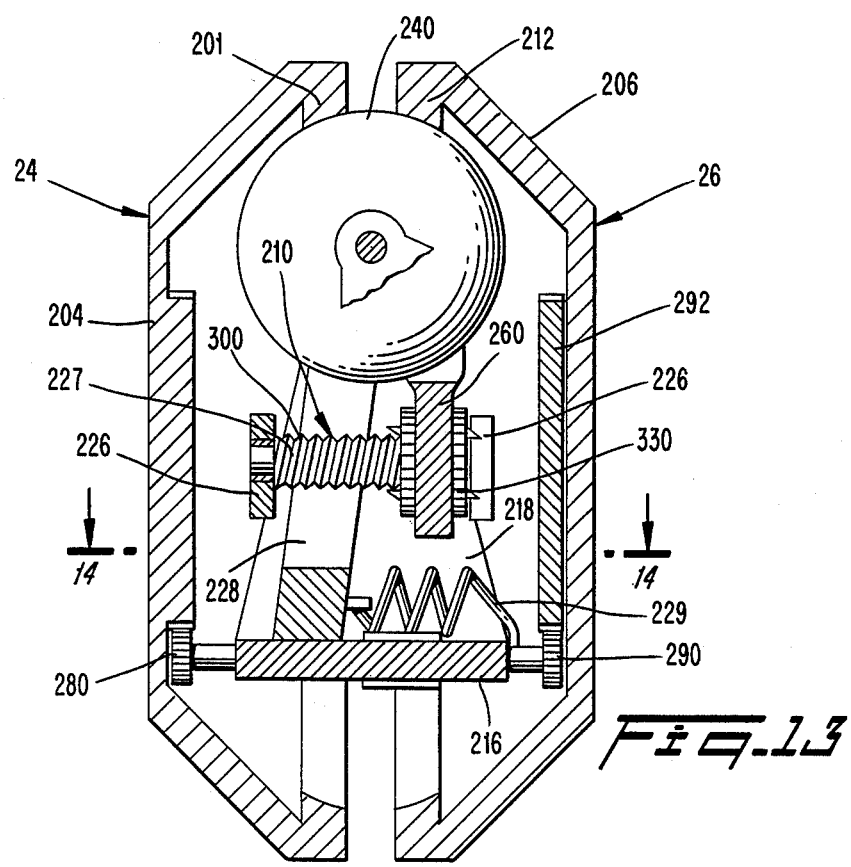
FIG. 13 is a side elevational view in partial cross section taken generally along the line 13—13 of FIG. 10 to illustrate features of the power steering means.

The rotatable gear 295 (FIG. 12) is carried by the control plate 260 and may have a generally U-shaped cross section so that the central shaft can extend therethrough. Gear teeth on the periphery of the gear 295 mesh with a rotatable nut 330 which is also mounted on the control plate 260. This rotatable nut 330 has an internal thread which conforms to the shape of external threads on the tubular threaded shaft 227 (FIG. 13). This tubular screw 227 extends between the arms 227 of the support means and is parallel with the shaft 200. The tubular screw 227 is nonrotably mounted in the differential mechanism 20 so that when the rotatable nut 330 is driven by meshed engagement with the rotatable gear on the control plate 260, the control plate 260 will be translated along the tubular screw 300.

Under conditions where the input angular velocity is clockwise when the differential mechanism 20 is viewed from the left in FIG. 11, it is desirable for the tubular screw 227 to have a left hand thread. With a left hand thread, when a control force is applied to the the tie link 324 towards the right along the centerline, the torque transmitting means 294 (FIG. 11) will be engaged and the control plate 260 will have a powered movement in the direction of the control force. Conversely, when a control force is applied to the tie link 324 towards the left along the centerline, the torque transmitting means 296 will be engaged and the control plate 260 will have a powered movement in the direction of the control force, i.e., to the left.

Operation of the Second Embodiment

When an input torque is applied to the shaft 200 (FIG. 11), that torque is directly transmitted to the input bell member 202 and the friction ring 201. Due to the frictional contact between the friction ring 201 and the spherical element 240 generated by the loading means 32, and due to the fact that the support means 22 is spatially fixed, the friction ring 201 transmits torque to the spherical element 240. With the spherical element 240 being simultaneously forced into engagement with the take-off friction ring 212 by the loading means 32, the spherical element 240 rotates about its axis and transmits torque to the take-off friction ring 212 and the output bell member 206. The relationship between the angular velocity of the output shaft 208 and the shaft 200 is determined by the orientation of the axis of the spherical element 240 which coincides with the axis of the bore 241 (FIG. 12).

While the torque applied to the shaft 200 (FIG. 11) causes the related output in the output shaft 208, the torque also causes the input gear 204 to rotate. Rotation of the input gear 204 (FIG. 11) is transmitted by the input pinion 280 to the input pinion shaft 282 and the direction reversal pinions 284, 286 where the rotational direction is reversed and transmitted through the output pinion shaft 288 to the output pinion 290 and the reversed gear 292. Since one of the two torque transmitting means is attached to the input gear 204 and the other of the two torque transmitting means is attached to the reversed gear 292, the two torque transmitting means rotate continuously in equal but opposite directions.

When it is desired to adjust the relative rotational speeds of the input bell member 202 and the output bell member 206, a control force is applied to the control linkage 239. That control force, due to the connection between the control linkage 239 and the clutch collar 313 of the segment 312 (FIG. 15) in each of the torque transmitting means, moves the clutch face of the appropriate torque transmitting means into engagement with the clutch teeth on the rotatable gear 295 (FIG. 12) carried by the control plate 260. So long as the control force is applied to the collar, the torque transmitting means will rotate the rotatable gear 295. As the gear 295 rotates, the rotatable nut 330 carried by the control plate 260 also rotates causing the the control plate 260 to translate along the fixed threaded shaft 227 and the central shaft 200.

When the control force is stopped, the rotatable gear 295 and the rotatable nut 330 will continue to rotate until the teeth of the engaged clutch faces are disengaged so that the torque transmitting means that has been driving the rotatable nut 298 is likewise disengaged.

Translatory movement of the control plate 260 (FIG. 11) causes the guide pins 268 to rotate about the axis of the gimbal 250. And, since the guide pins 268 are attached to the gimbal 250, the gimbal 250 is caused to move through a corresponding angular displacement. As the gimbal 250 is angularly displaced, the axis of the bearing mount 244 undergoes a corresponding angular displacement since it is fixed relative to the gimbal 250. When the axis of the bearing mount 244 rotates, different portions of the surface of the spherical element 240 move into engagement with the friction ring 201 and the take-off friction ring 212 (FIG. 14). Since the tangential velocity of these surface portions is a function of their radius and the surface portion which engages the friction ring 201, the ratio of the angular velocity of the output bell member 206 to the angular velocity of the input bell member 202 has a corresponding change.

In addition to uses where sharp truns are required, it is contemplated that the differential mechanism of this invention may be used for applications that do not require such extreme movements and where a symmetrical turning capability would be advantageous. In such applications, it may be useful to rotatably mount the differencing means in the support structure and to drive the end bell members from the differencing means at different speeds to accomplish the desired relative outputs. In such an application power needs and dynamic balancing needs would require circumferential symmetry with two or more spherical element assemblies.

The preferred embodiments of the differential mechanisms according to the present invention thus meet the desired objectives and produces numerous advantages. For example, to the extent that there is wear on the surfaces of the spherical element, the loading means compensates by moving the spherical element outwardly to maintain the desired frictional contact with the friction ring and the take-off friction ring.

Contoured surfaces of the friction ring and the take-off friction ring which contact the spherical element are machined to have a radius in the axial plane which is slightly greater than the radius of the spherical element to attain a certain traction zone and to achieve more nearly perfect rolling contact. Moreover, the machining operation is performed so that residual tooling marks actually aid in the operation of the device. Specifically, the axial orientation of the tooling marks augments the frictional engagement by further resisting slipping between the spherical element, the friction ring, and the take-off friction ring. The residual tooling marks also cooperate with the different modulii of elasticity of the shperical element, the friction ring and the take-off friction ring to allow elastic deformation of one of the surfaces to occur so that the tooling marks aid the frictional engagement.

Moreover, the spherical element is located inside the concavity of the friction rings (in both radial and axial planes). This arrangement reduces the hertzian stresses due to enwrapment of the spherical element by the contacting surfaces of the friction rings. In addition, the spherical element provides a good method of carrying the compressive loads. Still further, the self-centering action of the spherical element with respect to the friction rings enhances operation of the differential means.

The differential mechanism provides the ability for a device driven thereby to make steering turns about a vertical axis in either direction as well as to make severe turns culminating in a turn in place in one direction. Moreover, the differential mechanism allows a device to negotiate any more gradual curve in either direction or even more straight ahead. It is also significant that the input to the differential mechanism can be reversed, if desired. Control of this motion is provided in an extremely simple manner either by an axially slideable control rod or by an externally acutated linkage. Either control means effectively changes the ratio of the output angular velocity to the input angular velocity.

When a vehicle is driven by the differential mechanism and encounters slippery operating conditions, those slippery conditions do not operate to seriously impede forward progress of the vehicle. More particularly, if a drive wheel starts to slip, the differential mechanism does not divert all power to that slipping wheel. On the contrary, the torque proportioning which was established by the control means is maintained and the slippery condition is ignored unless both wheels spin simultaneously. As a result, the propensity of differential devices to dig themselves into holes in soil, snow, or ice when one wheel starts slipping is essentially avoided. Holes in soil result from physical interaction between a vehicle wheel and the soil; whereas, holes in ice or snow result from heat generated by friction between the vehicle wheel and the snow or ice. Thus, the differential eliminates wear and degradation of tire materials which occurs as a direct result of slippage.

Other advantages, too numerous to recite here in detail, will result as the differential mechanism 20 is used in various applications.

It will now be apparent that there has been provided in accordance with the present invention a differencing mechanism which overcomes the problems and disadvantages discussed above. Moreover, it will be apparent to those skilled in the art that there are numerous modifications, variations, substitutions and equivalents for features of the invention which do not depart from the spirit and scope of the invention. Accordingly, it is expressly intended that all such modifications, variations, substitutions and equivalents which fall within the spirit and scope of the invention as defined in the appended claims be embraced thereby.

What is claimed is:

1. A differential mechanism comprising:
   support means for mounting the mechanism on a central axis;

input means for delivering rotary power to the mechanism;

output means for receiving rotary power from the mechanism, supported by the input means;

differencing means for establishing a rotary speed relationship between the input means and the output means, the differencing means frictionally engaging the output means at a first zone and frictionally engaging the input means at a second zone, the distance of the first zone and the distance of the second zone from the central axis being essentially constant, said differencing means including a generally spherical element frictionally engaging both the input means and the output means at the first and second zones, and being rotatable about a ball axis, the ball axis being adjustable in a plane defined by said ball axis and the central axis such that the angle between the ball axis and the central axis is related to the relative rotational speeds of the input means and the output means, and the ball axis being movable through an angle of about 120° including a position disposed between the first zone and the second zone so that the input means and the output means can rotate in the same direction as well as in opposite directions;

loading means carried by the support means, engaging the differencing means to exert a radially outwardly directed force pressing the spherical element to the first zone and the second zone; and control means operably connected with the differencing means for regulating the differencing means to control the rotary speed relationship between the input means and the output means.

2. The differential mechanism of claim 1 wherein:
the input means includes a driving ring;
the output means includes a driven ring;
the driving ring and the driven ring are each made from a material having a modulus of elasticity of typical engineering metals; and
said generally spherical element is fashioned from a material having a modulus of elasticity substantially below the modulus of elasticity for the driving ring.

3. The differential mechanism of claim 2 wherein the driving ring and the driven ring each have a surface which generally conforms to the external shape of the spherical element and which includes radially oriented roughness.

4. The differential mechanism of claim 3 wherein the driving ring and the driven ring surface which generally conforms to the external shape of the spherical element has a radius in an axial cross section taken in the plane of the central axis which radius is greater than the radius of the spherical element.

5. The differential mechanism of claim 2 wherein the spherical element is fashioned from a structural thermoplastic material and both the driving ring and the driven ring are fashioned from a hardened metal.

6. The differential mechanism of claim 1 further including powered control means driven by the input means for regulating the differencing means.

7. The differential mechanism of claim 1 wherein the first zone and the second zone have the same distance from the central axis regardless of the angular position of the ball axis relative to the central axis.

8. The differential mechanism of claim 1 wherein the first zone and the second zone are concave surfaces.

9. A differential mechanism comprising:

support means for mounting the mechanism on a central axis;

input means for delivering rotary power to the mechanism;

output means for receiving rotary power from the mechanism, supported by the input means;

differencing means for establishing a rotary speed relationship between the input means and the output means, the differencing means frictionally engaging the output means at a first zone and frictionally engaging the input means at a second zone, the distance of the first zone and the distance of the second zone from the central axis being essentially constant, said differencing means including a generally cylindrical element frictionally engaging both the input means and the output means at the first and second zones, and being rotatable about a ball axis, the ball axis being adjustable in a plane defined by said ball axis and the central axis such that the angle between the ball axis and the central axis is related to the relative rotational speeds of the input means and the output means, and the ball axis being movable through an angle of about 120° including a position disposed between the first zone and the second zone so that the input means and the output means can rotate in the same direction as well as in opposite directions;

loading means carried by the support means, engaging the differencing means to exert a radially outwardly directed force pressing the spherical element to the first zone and the second zone; and control means operably connected with the differencing means for regulating the differencing means to control the rotary speed relationship between the input means and the output means;

wherein said generally spherical element is mounted on a gimbal having a gimbal axis generally perpendicular to the corresponding ball axis, the gimbal having a pair of ends slidably mounted in the support means for movement away from the central axis, each end being engaged by the loading means.

10. The differential mechanism of claim 9 wherein:
each end of said gimbal includes a spur gear;
an arm has a gear segment at one end which meshes with the spur gear so that the rotary position of the ball axis is determined by the position of the gear segment and a pin projecting from the other end; and
an axially slidable collar is carried by the input means and provided with a circumferential groove, the pin from each spur gear being received in the groove so that the axial position of the collar causes the position of each arm to change in unison.

11. The differential mechanism of claim 9 wherein:
the loading means includes a pair of generally H-shaped frames, each frame being journaled to a corresponding gimbal, each frame being pivotally connected to the other frame, each frame having a length greater than the distance from the central axis to the gimbal axis, and resilient means extending from the pivotal connection between the frames to the support means and being operable to force the gimbals away from the central axis.

12. A differential mechanism comprising:
support means for mounting the mechanism on a central axis;
input means for delivering rotary power to the mechanism;

output means for receiving rotary power from the mechanism, supported by the input means;

differencing means for establishing a rotary speed relationship between the input means and the output means, the differencing means frictionally engaging the output means at a first zone and frictionally engaging the input means at a second zone, the distance of the first zone and the distance of the second zone from the central axis being essentially constant, said differencing means including a generally spherical element frictionally engaging both the input means and the output means at the first and second zones, and being rotatable about a ball axis, the ball axis being adjustable in a plane defined by said ball axis and the central axis such that the angle between the ball axis and the central axis is related to the relative rotational speeds of the input means and the output means, and the ball axis being movable through an angle of about 120° including a position disposed between the first zone and the second zone so that the input means and the output means can rotate in the same direction as well as in opposite directions;

loading means carried by the support means, engaging the differencing means to exert a radially outwardly directed force pressing the spherical element to the first zone and the second zone; and control means operably connected with the differencing means for regulating the differencing means to control the rotary speed relationship between the input means and the output means;

wherein the input means includes an input shaft and a coaxial torque tube, each of which can be used to provide the input power.

13. A differential mechanism comprising:

support means for mounting the mechanism on a central axis;

input means for delivering rotary power to the mechanism;

output means for receiving rotary power from the mechanism, supported by the input means;

differencing means for establishing a rotary speed relationship between the input means and the output means, the differencing means frictionally engaging the output means at a first zone and frictionally engaging the input means at a second zone, the distance of the first zone and the distance of the second zone from the central axis being essentially constant, said differencing means including a generally spherical element frictionally engaging both the input means and the output means at the first and second zones, and being rotatable about a ball axis, the ball axis being adjustable in a plane defined by said ball axis and the central axis such that the angle between the ball axis and the central axis is related to the relative rotational speeds of the input means and the output means, and the ball axis being movable through an angle of about 120° including a position disposed between the first zone and the second zone so that the input means and the output means can rotate in the same direction as well as in opposite directions;

loading means carried by the support means, engaging the differencing means to exert a radially outwardly directed force pressing the spherical element to the first zone and the second zone; and control means operably connected with the differencing means for regulating the differencing means to control the rotary speed relationship between the input means and the output means;

wherein the control means includes:

an axially displaceable rod disposed within the shaft means;

an axially displaceable shuttle positioned between the shaft means and a torque tube means; and means connecting the rod and the shuttle, the connecting means also being attached to the differencing means so that axial displacement of a rod adjusts the differencing means.

14. A differential mechanism comprising:

support means for mounting the mechanism;

input means for delivering rotary power to the mechanism;

output means for receiving rotary power from the mechanism, supported by the input means;

differencing means for establishing a rotary speed relationship between the input means and the output means, the differencing means frictionally engaging the output means and frictionally engaging the input means;

loading means carried by the support means, engaging the differencing means to exert a radially outwardly directed force; and control means operably connected with the differencing means for regulating the differencing means to control the rotary speed relationship between the input means and the output means, including powered control means driven by the input means for regulating the differencing means, wherein the powered control means includes a threaded shaft carried by the support means;

an axially translatable plate having a rotatable means for engaging the threaded shaft;

torque extension means driven by the input means in opposing direction and juxtaposed to the rotatable means;

clutch means operable to connect the torque extension means with the rotatable means; and control means for the clutch means for causing selective engagement between the torque extension means and the rotatable means.

15. The differential mechanism of claim 14 wherein the torque extension means includes a plurality of axially slidable elements, each element including an annular collar and a plurality of axially extending legs, the elements being restrained from axial disassembly by a detent means so that torque is transmitted from the legs of one element directly to the legs of the adjacent element.

16. A differential mechanism comprising:

support means for mounting the mechanism on a central axis;

input means for delivering rotary power to the mechanism;

output means for receiving rotary power from the mechanism, supported by the input means;

differencing means for establishing a rotary speed relationship between the input means and the output means, the differencing means frictionally engaging the output means at a first zone and frictionally engaging the input means at a second zone, the distance of the first zone and the distance of the second zone from the central axis being essentially constant, said differencing means including a generally spherical element frictionally engaging both the input means and the output means at the first and second zones, and being rotatable about a ball axis, the ball axis being adjustable in a plane defined by said ball axis and the central axis such that the angle between the ball axis and the central axis is related to the relative rotational speeds of the input means and the output means, and the ball axis being movable through an angle of about 120° including a position disposed between the first zone and the second zone so that the input means and the output means can rotate in the same direction as well as in opposite directions;

loading means carried by the support means, engaging the differencing means to exert a radially outwardly directed force pressing the spherical element to the first zone and the second zone; and control means operably connected with the differencing means for regulating the differencing means to control the rotary speed relationship between the input means and the output means;

wherein a gimbal means mounts the spherical element, the gimbal means having a gimbal axis which is perpendicular to the plane containing the ball axis and displaced from the central axis.

17. The differential mechanism of claim 16 wherein:

the support means has a planar surface and a pair of arms extending from the planar surface;

the loading means includes a generally U-shaped frame journaled to the gimbal and positioned between the pair of arms, the U-shaped frame having a length greater than the distance from the planar surface to the gimbal axis, defining a pair of legs connected by a bight, the bight being slidable on the planar surface, movement of the legs being guided by contact between the gimbal means and the pair of arms; and resilient means extends between the loading means and the support means and is operable to force the gimbal away from the central axis.

18. The differential mechanism of claim 16 wherein:

the gimbal means has a pivot pin with a longitudinal axis generally parallel to the gimbal axis, the longitudinal axis being positioned between the gimbal axis and the central axis; and the control means includes carriage means translatable along the central axis for articulating the gimbal means about the gimbal axis, the carriage means being operably connected to the pivot pin to cause displacement of the pivot pin along the central axis.

* * * * *